(12) United States Patent
Yan et al.

(10) Patent No.: US 12,489,639 B2
(45) Date of Patent: Dec. 2, 2025

(54) ACCESS CONTROL METHOD, APPARATUS, NETWORK SIDE DEVICE, TERMINAL AND BLOCKCHAIN NODE

(71) Applicants: China Mobile Communication Co., Ltd Research Institute, Beijing (CN); China Mobile Communications Group Co., Ltd., Beijing (CN)

(72) Inventors: Junzhi Yan, Beijing (CN); Bo Yang, Beijing (CN); Li Su, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 253 days.

(21) Appl. No.: 18/259,518

(22) PCT Filed: Dec. 27, 2021

(86) PCT No.: PCT/CN2021/141520
§ 371 (c)(1),
(2) Date: Jun. 27, 2023

(87) PCT Pub. No.: WO2022/143498
PCT Pub. Date: Jul. 7, 2022

(65) Prior Publication Data
US 2024/0064021 A1  Feb. 22, 2024

(30) Foreign Application Priority Data
Dec. 29, 2020 (CN) .......................... 202011591112.0

(51) Int. Cl.
*H04L 29/06* (2006.01)
*H04L 9/00* (2022.01)
(Continued)

(52) U.S. Cl.
CPC .............. *H04L 9/3242* (2013.01); *H04L 9/14* (2013.01); *H04L 9/50* (2022.05)

(58) Field of Classification Search
None
See application file for complete search history.

(56) References Cited

U.S. PATENT DOCUMENTS

2017/0180128 A1   6/2017   Lu
2019/0020661 A1   1/2019   Zhang
(Continued)

FOREIGN PATENT DOCUMENTS

CN   108064440 A         5/2018
CN   108702622 A  *     10/2018   ............. H04L 63/08
(Continued)

OTHER PUBLICATIONS

Ghaffari Fariba et al, "Authentication and Access Control based on Distributed Ledger Technology: A survey", 2020 2nd Conference on Blockchain Research & Applications for Innovative Networks and Services (Brains), IEEE, Sep. 28, 2020.
(Continued)

*Primary Examiner* — Andrew J Steinle
(74) *Attorney, Agent, or Firm* — Price Heneveld LLP

(57) ABSTRACT

The present disclosure provides an access control method, an access control apparatus, a network side device, a terminal and a blockchain node, wherein the access control method includes: receiving relevant information to be verified that is sent by a terminal and corresponds to an access request, wherein the relevant information to be verified includes private key signature information of the terminal and position information of preset information in the blockchain; acquiring the preset information from the blockchain according to the position information; verifying the terminal according to the private key signature information and the (Continued)

preset information; acquiring, in a case that verification is passed, attribute information of the terminal from a blockchain ledger according to the preset information; and feedbacking a request response for access control to the terminal according to the attribute information.

20 Claims, 11 Drawing Sheets

(51) Int. Cl.
*H04L 9/14* (2006.01)
*H04L 9/32* (2006.01)

(56) References Cited

U.S. PATENT DOCUMENTS

| | | | |
|---|---|---|---|
| 2019/0306148 | A1 | 10/2019 | Uhr et al. |
| 2020/0336481 | A1 | 10/2020 | Fan et al. |
| 2021/0409227 | A1* | 12/2021 | Ponnuswamy ....... H04L 9/0825 |

FOREIGN PATENT DOCUMENTS

| | | | | |
|---|---|---|---|---|
| CN | 109495516 | A | | 3/2019 |
| CN | 110493007 | A | | 11/2019 |
| CN | 111601280 | A | | 8/2020 |
| CN | 111949953 | A | | 11/2020 |
| CN | 112039872 | A | | 12/2020 |
| CN | 114554567 | A * | 5/2022 | ............ H04W 40/20 |
| EP | 3401863 | A1 | | 11/2018 |
| JP | 2019500799 | A | | 1/2019 |
| JP | 2019506103 | A | | 2/2019 |
| JP | 2019185775 | A | | 10/2019 |
| JP | 2020099010 | A | | 6/2020 |
| JP | 2020178344 | A | | 10/2020 |
| WO | 2019104690 | A1 | | 6/2019 |
| WO | 2020141783 | A1 | | 7/2020 |

OTHER PUBLICATIONS

Rouhani Sara et al, "Blockchain based access control systems: State of the art and challenges", Companion Proceedings of the 2019 World Wide Web Conference, ACMPUB27, New York, NY, USA, Oct. 14, 2019.

* cited by examiner

ACCESS CONTROL METHOD, APPARATUS, NETWORK SIDE DEVICE, TERMINAL AND BLOCKCHAIN NODE

CROSS REFERENCE OF RELATED APPLICATION

This application is the U.S. national phase of PCT Application No. PCT/CN2021/141520 filed on Dec. 27, 2021, which claims priority to Chinese Patent Application No. 202011591112.0 filed on Dec. 29, 2020, the disclosures of which are incorporated in their entirety by reference herein.

TECHNICAL FIELD

The present disclosure relates to the field of communication technology, and in particular to an access control method, an access control apparatus, a network side device, a terminal and a blockchain node.

BACKGROUND

Access control refers to the means by which the system restricts the ability of using data resources for the user identity and the policy group that the user identity belongs to. The access control is an important basis for system confidentiality, integrity, availability, and legal use, which is one of the key policies for network security prevention and resource protection, and is also differed grant access performed by the subject on the object itself or its resources according to certain control policies or permissions.

The main purpose of access control is to restrict the access of the access subject to the object, so as to ensure the effective utilization and management of data resources within the legal scope. For example, system administrators control user access to network resources such as servers, directories, and files. In order to achieve the above-mentioned purpose, the access control needs to complete two tasks: identifying and confirming the user who accesses the system, and determining what type of access to certain system resource could be performed by the user.

The access control function may be implemented on the object, or a centralized device may be deployed to implement access control. For the former, the requirements for the object device are relatively high, and if the access volume is relatively large, the object performance will be seriously affected. The centralized deployed access control function is a commonly used technical means at present, the access subject initiates a request to the centralized access control system, after authentication and authorization, the access subject initiates access to the object.

It can also be understood that in traditional technologies, the access control system is a centralized device; however, the access control system is exposed to the network and is vulnerable to network attacks such as distributed denial of service (Distributed Denial of Service, DDoS). Once the controller is attacked by a network to stop serving, it may cause the entire system to fail to operate normally.

That is, there is a problem on a single point of failure caused by traditional authentication servers being attacked by DDoS in the related art.

SUMMARY

The purpose of the present disclosure is to provide an access control method, an access control apparatus, a network side device, a terminal and a blockchain node, so as to solve the problem on a single point of failure caused by traditional authentication servers being attacked by DDoS in the related art.

In order to solve the above-mentioned technical problem, an embodiment of the present disclosure provides an access control method, applied to a first network side device, which includes:

receiving relevant information to be verified that is sent by a terminal and corresponds to an access request, wherein the relevant information to be verified includes private key signature information of the terminal and position information of preset information in the blockchain;

acquiring the preset information from the blockchain according to the position information;

verifying the terminal according to the private key signature information and the preset information;

obtaining, in a case that verification is passed, attribute information of the terminal from a blockchain ledger according to the preset information;

feedbacking a request response for access control to the terminal according to the attribute information, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

Optionally, the receiving relevant information to be verified corresponding to the access request sent by the terminal includes:

receiving the access request sent by the terminal, wherein relevant information to be verified is carried in the access request; or, receiving the access request sent by the terminal;

feedbacking, according to the access request, a random number to the terminal;

receiving relevant information to be verified sent by the terminal according to the random number.

Optionally, the verifying, in the case that the preset information includes public key information of the terminal, the terminal according to the private key signature information and the preset information, includes:

using the public key information to verify the private key signature information;

the obtaining, in the case that verification is passed, attribute information of the terminal from the blockchain ledger according to the preset information, includes:

obtaining, in a case that the verification is passed, corresponding third terminal identification information from the blockchain ledger according to the public key information;

obtaining, in a case that the third terminal identification information is obtained, attribute information corresponding to the third terminal identification information from the blockchain ledger as attribute information of the terminal.

Optionally, the verifying, in the case that the preset information includes the first terminal identification information, the terminal according to the private key signature information and the preset information, includes:

obtaining, according to the first terminal identification information, the public key information to be verified and the stored public key information of the terminal from the blockchain ledger;

verifying, according to the public key information of the terminal, the public key information to be verified and the private key signature information;

obtaining, in the case that verification is passed, attribute information of the terminal from the blockchain ledger according to the preset information includes:

obtaining, in the case that the verification is passed, attribute information of the terminal from the blockchain ledger according to the first terminal identification information.

Optionally, the verifying, in the case that the preset information includes the second terminal identification information and the public key information, the terminal according to the private key signature information and the preset information, includes:

using the public key information in the preset information to verify the private key signature information; obtaining, according to the second terminal identification information, the stored public key information of the terminal from the blockchain ledger; and verifying, according to the acquired public key information of the terminal, the public key information in the preset information;

or, using the public key information in the preset information to verify the private key signature information; obtaining, according to the second terminal identification information, the stored hash value of the public key of the terminal from the blockchain ledger; obtaining, according to the public key information in the preset information, the hash value to be verified; and verifying, according to the obtained hash value of the public key of the terminal, the hash value to be verified.

Optionally, the verifying, in the case that the preset information includes the second terminal identification information and the hash value of the public key, the terminal according to the private key signature information and the preset information, includes:

obtaining, according to the second terminal identification information, the stored public key information of the terminal from the blockchain ledger;

obtaining, according to the hash value of the public key in the preset information, the public key information to be verified;

verifying, according to the public key information to be verified, the private key signature information; and verifying, according to the acquired public key information of the terminal, the public key information to be verified.

Optionally, the obtaining, in the case that the verification is passed, attribute information of the terminal from the blockchain ledger according to the preset information, includes:

obtaining, in a case that the verification is passed, attribute information of the terminal from the blockchain ledger according to the second terminal identification information.

Optionally, the private key signature information includes first signature information on a timestamp using the private key of the terminal, or second signature information of the random number on the first network side device in response to the access request sent by using the private key of the terminal.

Optionally, in a case that the private key signature information includes the first signature information, the relevant information to be verified further includes the timestamp;

the verifying the terminal according to the private key signature information and the preset information includes:

confirming whether the timestamp is within a validity period;

verifying, in a case that the timestamp is within the validity period, the terminal according to the private key signature information and the preset information.

Optionally, the preset information further includes validity period information of the first information; the first information includes at least one of the attribute information, the first terminal identification information and the second terminal identification information;

the verifying the terminal according to the private key signature information and the preset information includes:

confirming, according to the validity period information, whether the first information is within the validity period;

verifying, in a case that the first information is within the validity period, the terminal according to the private key signature information and other information except the validity period information in the preset information.

Optionally, at least one authentication information related to the terminal is stored in the blockchain ledger as encrypted information encrypted with a first key; the relevant information to be verified further includes the first key encrypted with the public key of the first network side device;

prior to the feeding back, according to the attribute information, the request response for access control to the terminal, the method further includes:

using the private key of the first network side device to decrypt the first key encrypted by the public key to obtain the first key;

decrypting, according to the first key, the encrypted information obtained from the blockchain ledger to obtain the at least one authentication information, wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of a second information, wherein the timestamp is a timestamp of a first signature information obtained by signing with the private key of the terminal;

the second information includes at least one of the attribute information, first terminal identification information, second terminal identification information, and third terminal identification information.

The embodiment of the present disclosure also provides an access control method, applied to a terminal, the method includes:

sending relevant information to be verified corresponding to an access request to a first network side device, wherein the relevant information to be verified includes private key signature information of the terminal and position information of preset information in the blockchain;

receiving a request response for access control feedback by the first network side device, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

Optionally, the sending the relevant information to be verified corresponding to the access request to the first network side device includes:

sending the access request to the first network side device, wherein the relevant information to be verified is carried in the access request; or, sending the access request to the first network side device;

receiving a random number feedback by the first network side device according to the access request;

sending, according to the random number, relevant information to be verified to the first network side device.

Optionally, the private key signature information includes first signature information on a timestamp using the private key of the terminal, or second signature information of the random number on the first network side device in response to the access request sent by using the private key of the terminal;

Optionally, in a case that the private key signature information includes the first signature information, the relevant information to be verified further includes the timestamp.

Optionally, the preset information further includes validity period information of the first information; the first information includes at least one of the attribute information of the terminal, the first terminal identification information and the second terminal identification information.

Optionally, at least one authentication information related to the terminal is stored in the blockchain ledger as encrypted information encrypted with a first key; the relevant information to be verified further includes the first key encrypted with the public key of the first network side device;

wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of the second information, wherein the timestamp is a timestamp of the first signature information obtained by signing with the private key of the terminal;

the second information includes at least one of the attribute information, first terminal identification information, second terminal identification information, and third terminal identification information.

Optionally, prior to the sending the relevant information to be verified corresponding to the access request to the first network side device, the method further includes:

sending information to be authenticated of the terminal to a first blockchain node, wherein the information to be authenticated includes user credential information and/or attribute information; the user credential information includes terminal identification information.

The embodiment of the present disclosure also provides an access control method, applied to a first blockchain node, wherein the method includes:

receiving information to be authenticated sent by a terminal;

authenticating the information to be authenticated;

storing, in a case that authentication is passed, at least one authentication information corresponding to the information to be authenticated in a blockchain ledger, wherein the information to be authenticated includes user credential information and/or attribute information; the user credential information includes terminal identification information;

the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of a second information, wherein the timestamp is a timestamp of the first signature information obtained by signing with the private key of the terminal;

the second information includes at least one of the attribute information, first terminal identification information, second terminal identification information, and third terminal identification information.

Optionally, the storing, in the case that the authentication is passed, at least one authentication information corresponding to the information to be authenticated in the blockchain ledger includes:

generating randomly a first key for encryption;

using the first key to encrypt the at least one authentication information for storing in the blockchain ledger.

Optionally, after the generating randomly the first key for encryption, the method further includes:

using the public key of the terminal to encrypt the first key for storing in the blockchain ledger.

Optionally, the authenticating the information to be authenticated includes:

sending, according to a first preset policy, user credential information in the information to be authenticated to at least one second network side device for authentication;

receiving a first authentication result feedback by the at least one second network side device and corresponding third signature information;

obtaining, according to a second preset policy, the first authentication result and the third signature information, a first final result of whether the user credential information is authenticated and passed.

Optionally, the authenticating the information to be authenticated includes:
sending, according to a first preset policy, attribute information in the information to be authenticated to at least one third network side device for authentication;
receiving a second authentication result feedback by the at least one third network side device and corresponding fourth signature information;
obtaining, according to a third preset policy, the second authentication result and the fourth signature information, a second final result of whether the attribute information is authenticated and passed.

Optionally, the authenticating the information to be authenticated includes:
sending the information to be authenticated to a second blockchain node;
receiving a first authentication result corresponding to the user credential information in the information to be authenticated feedback by the second blockchain node and corresponding third signature information; and obtaining, according to a second preset policy, the first authentication result and third signature information, a first final result of whether the user credential information is authenticated and passed; and/or,
receiving a second authentication result corresponding to the attribute information in the information to be authenticated feedback by the second blockchain node and corresponding fourth signature information; and obtaining, according to a third preset policy, the second authentication result and fourth signature information, a second final result of whether the attribute information is authenticated and passed.

An embodiment of the present disclosure also provides an access control method, applied to a second blockchain node, the method includes:
receiving the information to be authenticated of the terminal sent by the first blockchain node;
sending the user credential information in the information to be authenticated to at least one second network side device for authentication, and receiving the first authentication result feedback by the at least one second network side device and corresponding third signature information for feedbacking to the first blockchain node; and/or,
sending the attribute information in the information to be authenticated to at least one third network side device for authentication, and receiving the second authentication result feedback by the at least one third network side device and the corresponding fourth signature information for feedbacking to the first blockchain node,
wherein the user credential information includes terminal identification information.

An embodiment of the present disclosure also provides an access control method, applied to a second network side device, which includes:
receiving the user credential information of the terminal to be authenticated sent by the blockchain node;
authenticating the user credential information to obtain a first authentication result, and using third signature information for signature;
feedbacking the first authentication result and the third signature information to the blockchain node;
wherein the blockchain node is a first blockchain node or a second blockchain node communicating with the first blockchain node;
the user credential information includes terminal identification information.

An embodiment of the present disclosure also provides an access control method, applied to a third network side device, which includes:
receiving the attribute information of the terminal to be authenticated sent by the blockchain node;
authenticating the attribute information to obtain a second authentication result, and using fourth signature information for signature;
feedbacking the second authentication result and the fourth signature information to the blockchain node,
wherein the blockchain node is a first blockchain node or a second blockchain node communicating with the first blockchain node.

The embodiment of the present disclosure also provides an access control apparatus, applied to a first network side device, wherein the access control apparatus comprises:
a first receiving module, configured to receive relevant information to be verified that is sent by a terminal and corresponds to an access request, wherein the relevant information to be verified includes private key signature information of the terminal and position information of preset information in the blockchain;
a first obtaining module, configured to obtain, according to the position information, the preset information from the blockchain;
a first verifying module, configured to verify the terminal according to the private key signature information and the preset information;
a second receiving module, configured to obtain, in a case that verification is passed, attribute information of the terminal from a blockchain ledger according to the preset information;
a first feedback module, configured to feedback, according to the attribute information, a request response for access control to the terminal,
wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

Optionally, the receiving relevant information to be verified corresponding to the access request sent by the terminal includes:
receiving the access request sent by the terminal, wherein the relevant information to be verified is carried in the access request; or,
receiving the access request sent by the terminal;
feedbacking, according to the access request, a random number to the terminal;
receiving relevant information to be verified sent by the terminal according to the random number.

Optionally, the verifying, in a case that the preset information includes public key information of the terminal, the terminal according to the private key signature information and the preset information includes:
using the public key information to verify the private key signature information;

the obtaining, in a case that the verification is passed, attribute information of the terminal from the blockchain ledger according to the preset information, includes:
  obtaining, in a case that the verification is passed, corresponding third terminal identification information from the blockchain ledger according to the public key information;
  obtaining, in a case that the third terminal identification information is obtained, attribute information corresponding to the third terminal identification information from the blockchain ledger as attribute information of the terminal.

Optionally, the verifying, in the case that the preset information includes the first terminal identification information, the terminal according to the private key signature information and the preset information includes:
  obtaining, according to the first terminal identification information, the public key information to be verified and the stored public key information of the terminal from the blockchain ledger;
  verifying, according to the public key information of the terminal, the public key information to be verified and the private key signature information;
  obtaining, in the case that verification is passed, attribute information of the terminal from the blockchain ledger according to the preset information includes:
  obtaining, in the case that the verification is passed, attribute information of the terminal from the blockchain ledger according to the first terminal identification information.

Optionally, the verifying, in the case that the preset information includes the second terminal identification information and the public key information, the terminal according to the private key signature information and the preset information, includes:
  using the public key information in the preset information to verify the private key signature information; obtaining, according to the second terminal identification information, the stored public key information of the terminal from the blockchain ledger; and verifying, according to the acquired public key information of the terminal, the public key information in the preset information;
or,
  using the public key information in the preset information to verify the private key signature information; obtaining, according to the second terminal identification information, the stored hash value of the public key of the terminal from the blockchain ledger; obtaining, according to the public key information in the preset information, the hash value to be verified; and verifying, according to the obtained hash value of the public key of the terminal, the hash value to be verified.

Optionally, the verifying, in the case that the preset information includes the second terminal identification information and the hash value of the public key, the terminal according to the private key signature information and the preset information, includes:
  obtaining, according to the second terminal identification information, the stored public key information of the terminal from the blockchain ledger;
  obtaining, according to the hash value of the public key in the preset information, the public key information to be verified;
  verifying, according to the public key information to be verified, the private key signature information; and
  verifying, according to the acquired public key information of the terminal, the public key information to be verified.

Optionally, the obtaining, in the case that the verification is passed, attribute information of the terminal from the blockchain ledger according to the preset information, includes:
  obtaining, in a case that the verification is passed, attribute information of the terminal from the blockchain ledger according to the second terminal identification information.

Optionally, the private key signature information includes first signature information on a timestamp using the private key of the terminal, or second signature information of the random number on the first network side device in response to the access request sent by using the private key of the terminal.

Optionally, in a case that the private key signature information includes the first signature information, the relevant information to be verified further includes the timestamp;
  the verifying the terminal according to the private key signature information and the preset information includes:
  confirming whether the timestamp is within a validity period;
  verifying, in a case that the timestamp is within the validity period, the terminal according to the private key signature information and the preset information.

Optionally, the preset information further includes validity period information of the first information; the first information includes at least one of the attribute information, the first terminal identification information and the second terminal identification information;
  the verifying the terminal according to the private key signature information and the preset information includes:
  confirming, according to the validity period information, whether the first information is within the validity period;
  verifying, in a case that the first information is within the validity period, the terminal according to the private key signature information and other information except the validity period information in the preset information.

Optionally, at least one authentication information related to the terminal is stored in the blockchain ledger as encrypted information encrypted with a first key; the relevant information to be verified further includes the first key encrypted with the public key of the first network side device;
  the access control apparatus also includes:
  a first decrypting module, configured to use, prior to the feeding back the request response for access control to the terminal according to the attribute information, the private key of the first network side device to decrypt the first key encrypted by the public key to obtain the first key;
  a second decrypting module, configured to decrypt, according to the first key, the encrypted information obtained from the blockchain ledger to obtain the at least one authentication information,
  wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of a second information, wherein the timestamp is a timestamp of a first signature information obtained by signing with the private key of the terminal;

the second information includes at least one of the attribute information, first terminal identification information, second terminal identification information, and third terminal identification information.

The embodiment of the present disclosure also provides an access control apparatus, applied to a terminal, wherein the access control apparatus comprises:

a first sending module, configured to send relevant information to be verified corresponding to an access request to a first network side device, wherein the relevant information to be verified includes private key signature information of the terminal and position information of preset information in the blockchain;

a third receiving module, configured to receive a request response for access control feedback by the first network side device, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

Optionally, the sending the relevant information to be verified corresponding to the access request to the first network side device includes:

sending the access request to the first network side device, wherein the relevant information to be verified is carried in the access request; or, sending the access request to the first network side device; receiving a random number feedback by the first network side device according to the access request;

sending, according to the random number, relevant information to be verified to the first network side device.

Optionally, the private key signature information includes first signature information on a timestamp using the private key of the terminal, or second signature information of the random number on the first network side device in response to the access request sent by using the private key of the terminal.

Optionally, in a case that the private key signature information includes the first signature information, the relevant information to be verified further includes the timestamp.

Optionally, the preset information further includes validity period information of the first information; the first information includes at least one of the attribute information of the terminal, the first terminal identification information and the second terminal identification information.

Optionally, at least one authentication information related to the terminal is stored in the blockchain ledger as encrypted information encrypted with a first key; the relevant information to be verified further includes the first key encrypted with the public key of the first network side device;

wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of the second information, wherein the timestamp is a timestamp of the first signature information obtained by signing with the private key of the terminal;

the second information includes at least one of the attribute information, first terminal identification information, second terminal identification information, and third terminal identification information.

Optionally, the apparatus further comprises:

a second sending module, configured to send, prior to the sending the relevant information to be verified corresponding to the access request to the first network side device, information to be authenticated of the terminal to a first blockchain node, wherein the information to be authenticated includes user credential information and/or attribute information; the user credential information includes terminal identification information.

The embodiment of the present disclosure also provides an access control apparatus, applied to a first blockchain node, wherein the apparatus includes:

a fourth receiving module, configured to receive information to be authenticated sent by a terminal;

a first authenticating module, configured to authenticate the information to be authenticated;

a first storage module, configured to store, in a case that authentication is passed, at least one authentication information corresponding to the information to be authenticated in a blockchain ledger, wherein the information to be authenticated includes user credential information and/or attribute information; the user credential information includes terminal identification information;

the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of a second information, wherein the timestamp is a timestamp of the first signature information obtained by signing with the private key of the terminal;

the second information includes at least one of the attribute information, first terminal identification information, second terminal identification information, and third terminal identification information.

Optionally, the storing, in the case that the authentication is passed, at least one authentication information corresponding to the information to be authenticated in the blockchain ledger includes:
  generating randomly a first key for encryption;
  using the first key to encrypt the at least one authentication information for storing in the blockchain ledger.

Optionally, the apparatus further includes:
  a first processing module, configured to use, after the generating randomly the first key for encryption, the public key of the terminal to encrypt the first key for storing in the blockchain ledger.

Optionally, the authenticating the information to be authenticated includes:
  sending, according to a first preset policy, user credential information in the information to be authenticated to at least one second network side device for authentication;
  receiving a first authentication result feedback by the at least one second network side device and corresponding third signature information;
  obtaining, according to a second preset policy, the first authentication result and the third signature information, a first final result of whether the user credential information is authenticated and passed.

Optionally, the authenticating the information to be authenticated includes:
  sending, according to a first preset policy, attribute information in the information to be authenticated to at least one third network side device for authentication;
  receiving a second authentication result feedback by the at least one third network side device and corresponding fourth signature information;
  obtaining, according to a third preset policy, the second authentication result and the fourth signature information, a second final result of whether the attribute information is authenticated and passed.

Optionally, the authenticating the information to be authenticated includes:
  sending the information to be authenticated to a second blockchain node;
  receiving a first authentication result corresponding to the user credential information in the information to be authenticated feedback by the second blockchain node and corresponding third signature information; and obtaining, according to a second preset policy, the first authentication result and third signature information, a first final result of whether the user credential information is authenticated and passed; and/or,
  receiving a second authentication result corresponding to the attribute information in the information to be authenticated feedback by the second blockchain node and corresponding fourth signature information; and obtaining, according to a third preset policy, the second authentication result and fourth signature information, a second final result of whether the attribute information is authenticated and passed.

An embodiment of the present disclosure provides an access control apparatus, applied to the second blockchain node, which includes:
  a fifth receiving module, configured to receive information to be authenticated of the terminal sent by a first blockchain node;
  a second processing module, configured to send user credential information in the information to be authenticated to at least one second network side device for authentication, and receive a first authentication result feedback by the at least one second network side device and corresponding third signature information for feedbacking to the first blockchain node; and/or,
  a third processing module, configured to send the attribute information in the information to be authenticated to at least one third network side device for authentication; and receive a second authentication result feedback by the at least one third network side device and corresponding fourth signature information for feedbacking to the first blockchain node,
  wherein the user credential information includes terminal identification information.

An embodiment of the present disclosure also provides an access control apparatus, applied to a second network side device, which includes:
  a sixth receiving module, configured to receive the user credential information of the terminal to be authenticated sent by the blockchain node;
  a fourth processing module, configured to authenticate the user credential information to obtain a first authentication result, and use a third signature information for signature; and
  a second feedback module, configured to feedback the first authentication result and the third signature information to the blockchain node,
  wherein the blockchain node is a first blockchain node or a second blockchain node communicating with the first blockchain node;
  the user credential information includes terminal identification information.

An embodiment of the present disclosure also provides an access control apparatus, applied to a third network side device, which includes:
  a seventh receiving module, configured to receive the attribute information of the terminal to be authenticated sent by the blockchain node;
  a fifth processing module, configured to authenticate the attribute information to obtain a second authentication result, and use a fourth signature information for signature; and
  a third feedback module, configured to feedback the second authentication result and the fourth signature information to the blockchain node,
  wherein the blockchain node is a first blockchain node or a second blockchain node communicating with the first blockchain node.

An embodiment of the present disclosure also provides a network side device, the network side device is a first network side device, including: a processor and a transceiver, where
  the processor is configured to receive, through the transceiver, relevant information to be verified that is sent by a terminal and corresponds to an access request, wherein the relevant information to be verified includes private key signature information of the terminal and position information of preset information in the blockchain;
  obtain, according to the position information, the preset information from the blockchain;
  verify the terminal according to the private key signature information and the preset information;
  obtain, in a case that verification is passed, attribute information of the terminal from a blockchain ledger according to the preset information;
  feedback, according to the attribute information, a request response for access control to the terminal through the transceiver, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

Optionally, the receiving relevant information to be verified corresponding to the access request sent by the terminal includes:
  receiving the access request sent by the terminal, wherein relevant information to be verified is carried in the access request; or,
  receiving the access request sent by the terminal;
  feedbacking, according to the access request, a random number to the terminal;
  receiving relevant information to be verified sent by the terminal according to the random number.

Optionally, the verifying, in the case that the preset information includes public key information of the terminal, the terminal according to the private key signature information and the preset information, includes:
  using the public key information to verify the private key signature information;
  the obtaining, in the case that verification is passed, attribute information of the terminal from the blockchain ledger according to the preset information includes:
  obtaining, in a case that the verification is passed, corresponding third terminal identification information from the blockchain ledger according to the public key information;
  obtaining, in a case that the third terminal identification information is obtained, attribute information corresponding to the third terminal identification information from the blockchain ledger as attribute information of the terminal.

Optionally, the verifying, in the case that the preset information includes the first terminal identification information, the terminal according to the private key signature information and the preset information, includes:
  obtaining, according to the first terminal identification information, the public key information to be verified and the stored public key information of the terminal from the blockchain ledger;
  verifying, according to the public key information of the terminal, the public key information to be verified and the private key signature information;
  obtaining, in the case that verification is passed, attribute information of the terminal from the blockchain ledger according to the preset information includes:
  obtaining, in the case that the verification is passed, attribute information of the terminal from the blockchain ledger according to the first terminal identification information.

Optionally, the verifying, in the case that the preset information includes the second terminal identification information and the public key information, the terminal according to the private key signature information and the preset information, includes:
  using the public key information in the preset information to verify the private key signature information; obtaining, according to the second terminal identification information, the stored public key information of the terminal from the blockchain ledger; and verifying, according to the acquired public key information of the terminal, the public key information in the preset information; or,
  using the public key information in the preset information to verify the private key signature information; obtaining, according to the second terminal identification information, the stored hash value of the public key of the terminal from the blockchain ledger; obtaining, according to the public key information in the preset information, the hash value to be verified; and verifying, according to the obtained hash value of the public key of the terminal, the hash value to be verified.

Optionally, the verifying, in the case that the preset information includes the second terminal identification information and the hash value of the public key, the terminal according to the private key signature information and the preset information, includes:
  obtaining, according to the second terminal identification information, the stored public key information of the terminal from the blockchain ledger;
  obtaining, according to the hash value of the public key in the preset information, the public key information to be verified;
  verifying, according to the public key information to be verified, the private key signature information; and verifying, according to the acquired public key information of the terminal, the public key information to be verified.

Optionally, the obtaining, in a case that the verification is passed, attribute information of the terminal from the blockchain ledger according to the preset information, includes:
  obtaining, in a case that the verification is passed, attribute information of the terminal from the blockchain ledger according to the second terminal identification information.

Optionally, the private key signature information includes first signature information on a timestamp using the private key of the terminal, or second signature information of the random number on the first network side device in response to the access request sent by using the private key of the terminal;

Optionally, in a case that the private key signature information includes the first signature information, the relevant information to be verified further includes the timestamp;
  the verifying the terminal according to the private key signature information and the preset information includes:
  confirming whether the timestamp is within a validity period;
  verifying, in a case that the timestamp is within the validity period, the terminal according to the private key signature information and the preset information.

Optionally, the preset information further includes validity period information of the first information; the first information includes at least one of the attribute information, the first terminal identification information and the second terminal identification information;
  the verifying the terminal according to the private key signature information and the preset information includes:
  confirming, according to the validity period information, whether the first information is within the validity period;
  verifying, in a case that the first information is within the validity period, the terminal according to the private key signature information and other information except the validity period information in the preset information.

Optionally, at least one authentication information related to the terminal is stored in the blockchain ledger as encrypted information encrypted with a first key; the relevant information to be verified further includes the first key encrypted with the public key of the first network side device;

the processor is also configured to use, prior to the feeding back the request response for access control to the terminal according to the attribute information, the private key of the first network side device to decrypt the first key encrypted by the public key to obtain the first key;

decrypting, according to the first key, the encrypted information obtained from the blockchain ledger to obtain the at least one authentication information, wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of a second information, wherein the timestamp is a timestamp of a first signature information obtained by signing with the private key of the terminal;

the second information includes at least one of the attribute information, first terminal identification information, second terminal identification information, and third terminal identification information.

An embodiment of the present disclosure also provides a terminal, including: a processor and a transceiver, where the processor is configured to send, through the transceiver, relevant information to be verified corresponding to an access request to a first network side device, wherein the relevant information to be verified includes private key signature information of the terminal and position information of preset information in the blockchain;

receive, through the transceiver, a request response for access control feedback by the first network side device, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

Optionally, the sending the relevant information to be verified corresponding to the access request to the first network side device includes:

sending the access request to the first network side device, wherein the relevant information to be verified is carried in the access request; or, sending the access request to the first network side device;

receiving a random number feedback by the first network side device according to the access request;

sending, according to the random number, relevant information to be verified to the first network side device.

Optionally, the private key signature information includes first signature information on a timestamp using the private key of the terminal, or second signature information of the random number on the first network side device in response to the access request sent by using the private key of the terminal;

Optionally, in a case that the private key signature information includes the first signature information, the relevant information to be verified further includes the timestamp.

Optionally, the preset information further includes validity period information of the first information; the first information includes at least one of the attribute information of the terminal, the first terminal identification information and the second terminal identification information.

Optionally, at least one authentication information related to the terminal is stored in the blockchain ledger as encrypted information encrypted with a first key; the relevant information to be verified further includes the first key encrypted with the public key of the first network side device;

wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of the second information, wherein the timestamp is a timestamp of the first signature information obtained by signing with the private key of the terminal;

the second information includes at least one of the attribute information, first terminal identification information, second terminal identification information, and third terminal identification information.

Optionally, the processor is also configured to send, prior to the sending the relevant information to be verified corresponding to the access request to the first network side device, information to be authenticated of the terminal to a first blockchain node through the transceiver, wherein the information to be authenticated includes user credential information and/or attribute information; the user credential information includes terminal identification information.

An embodiment of the present disclosure also provides a blockchain node, the blockchain node is a first blockchain node, including: a processor and a transceiver, where the processor is configured to receive, through the transceiver, information to be authenticated sent by a terminal;

authenticate the information to be authenticated;

store, in a case that authentication is passed, at least one authentication information corresponding to the information to be authenticated in a blockchain ledger, wherein the information to be authenticated includes user credential information and/or attribute information; the user credential information includes terminal identification information;

the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Optionally, the at least one authentication information further includes: a timestamp corresponding to the terminal; and/or, validity period information of a second information, wherein the timestamp is a timestamp of the first signature information obtained by signing with the private key of the terminal;

the second information includes at least one of the attribute information, first terminal identification information, second terminal identification information, and third terminal identification information.

Optionally, the storing, in the case that the authentication is passed, at least one authentication information corresponding to the information to be authenticated in the blockchain ledger includes:

generating randomly a first key for encryption;

using the first key to encrypt the at least one authentication information for storing in the blockchain ledger.

Optionally, the processor is also configured to use, after the generating randomly the first key for encryption, the public key of the terminal to encrypt the first key for storing in the blockchain ledger.

Optionally, the authenticating the information to be authenticated includes:

sending, according to a first preset policy, user credential information in the information to be authenticated to at least one second network side device for authentication;

receiving a first authentication result feedback by the at least one second network side device and corresponding third signature information;

obtaining, according to a second preset policy, the first authentication result and the third signature information, a first final result of whether the user credential information is authenticated and passed.

Optionally, the authenticating the information to be authenticated includes:

sending, according to a first preset policy, attribute information in the information to be authenticated to at least one third network side device for authentication;

receiving a second authentication result feedback by the at least one third network side device and corresponding fourth signature information;

obtaining, according to a third preset policy, the second authentication result and the fourth signature information, a second final result of whether the attribute information is authenticated and passed.

Optionally, the authenticating the information to be authenticated includes:

sending the information to be authenticated to a second blockchain node;

receiving a first authentication result corresponding to the user credential information in the information to be authenticated feedback by the second blockchain node and corresponding third signature information; and obtaining, according to a second preset policy, the first authentication result and third signature information, a first final result of whether the user credential information is authenticated and passed; and/or, receiving a second authentication result corresponding to the attribute information in the information to be authenticated feedback by the second blockchain node and corresponding fourth signature information; and obtaining, according to a third preset policy, the second authentication result and fourth signature information, a second final result of whether the attribute information is authenticated and passed.

An embodiment of the present disclosure also provides a blockchain node, the blockchain node is a second blockchain node, which includes: a processor and a transceiver, where the processor is configured to receive, through the transceiver, information to be authenticated of the terminal sent by the first blockchain node;

send, through the transceiver, the user credential information in the information to be authenticated to at least one second network side device for authentication, and receive the first authentication result feedback by the at least one second network side device and the corresponding third signature information for feedbacking to the first blockchain node; and/or, send, through the transceiver, the attribute information in the information to be authenticated to at least one third network side device for authentication, and receive a second authentication result feedback by the at least one third network side device and a corresponding fourth signature information for feedbacking to the first blockchain node;

wherein the user credential information includes terminal identification information.

An embodiment of the present disclosure also provides a network side device, the network side device is a second network side device, including: a processor and a transceiver, where the processor is configured to receive, through the transceiver, the user credential information of the terminal to be authenticated sent by the blockchain node;

authenticate the user credential information to obtain a first authentication result, and use the third signature information for signature;

feedback, through the transceiver, the first authentication result and the third signature information to the blockchain node, wherein the blockchain node is a first blockchain node or a second blockchain node communicating with the first blockchain node;

the user credential information includes terminal identification information.

An embodiment of the present disclosure also provides a network side device, wherein the network side device is a third network side device, which includes: a processor and a transceiver;

the processor is configured to receive, through the transceiver, attribute information of the terminal to be authenticated sent by the blockchain node;

authenticate the attribute information to obtain a second authentication result, and use the fourth signature information for signature;

feedback, through the transceiver, the second authentication result and the fourth signature information to the blockchain node, wherein the blockchain node is a first blockchain node or a second blockchain node communicating with the first blockchain node.

An embodiment of the present disclosure also provides a network side device, including a memory, a processor, and a program stored on the memory and operable on the processor; wherein when the program is executed by the processor, the access control method of the above-mentioned first network side device side is implemented; or, when the program is executed by the processor, the access control method of the above-mentioned second network side device side is implemented; or when the program is executed by the processor, the access control method of the above-mentioned third network side device side is implemented.

An embodiment of the present disclosure also provides a terminal, including a memory, a processor, and a program stored on the memory and operable on the processor; wherein when the program is executed by the processor, the access control method of the above-mentioned terminal side is implemented.

An embodiment of the present disclosure also provides a blockchain node, including a memory, a processor, and a program stored on the memory and operable on the processor; wherein when the program is executed by the processor, the access control method of the above-mentioned first blockchain node side is implemented; or, when the program is executed by the processor, the access control method of the above-mentioned second blockchain node side is implemented.

An embodiment of the present disclosure also provides a readable storage medium, on which a program is stored, wherein when the program is executed by a processor, steps in the access control method of the above-mentioned first network side device side is implemented; or, when the program is executed by a processor, steps in the access control method of the above-mentioned terminal side is implemented; or, when the program is executed by a processor, steps in the access control method of the above-mentioned first blockchain node side is implemented; or, when the program is executed by a processor, steps in the access control method of the above-mentioned second blockchain node side is implemented; or, when the program is executed by a processor, steps in the access control method of the above-mentioned second network side device side is implemented; or, when the program is executed by a processor, steps in the access control method of the above-mentioned third network side device side is implemented.

The beneficial effects of the aforementioned technical solutions of the present disclosure are as follows.

In the above-mentioned solutions, the access control method includes: receiving the relevant information to be verified corresponding to the access request sent by the terminal, wherein the relevant information to be verified includes the private key signature information of the terminal and position information of preset information in the blockchain; acquiring the preset information from the blockchain according to the position information; verifying the terminal according to the private key signature information and the preset information; acquiring, in a case that verification is passed, attribute information of the terminal from a blockchain ledger according to the preset information; feedbacking a request response for access control to the terminal according to the attribute information, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal; the method can support and achieve the scheme of using blockchain for access control, and provide attribute verification services to customers in the form of blockchain, can avoid the similar problem on a single point of failure caused by traditional authentication servers being attacked by DDoS.

BRIEF DESCRIPTION OF THE DRAWINGS

In order to more clearly explain the technical solutions of the embodiments of the present disclosure, the drawings that need to be used in the description of the embodiments of the present disclosure will be briefly described below, obviously, the drawings in the following description are only some embodiments of the present disclosure, for those ordinarily skilled in the art, without paying creative work, other drawings may also be obtained based on these drawings.

DETAILED DESCRIPTION

In order to make the technical problems, technical solutions and advantages to be solved by the present disclosure clearer, it will be described in detail with reference to the drawings and specific embodiments below.

Figure 1:
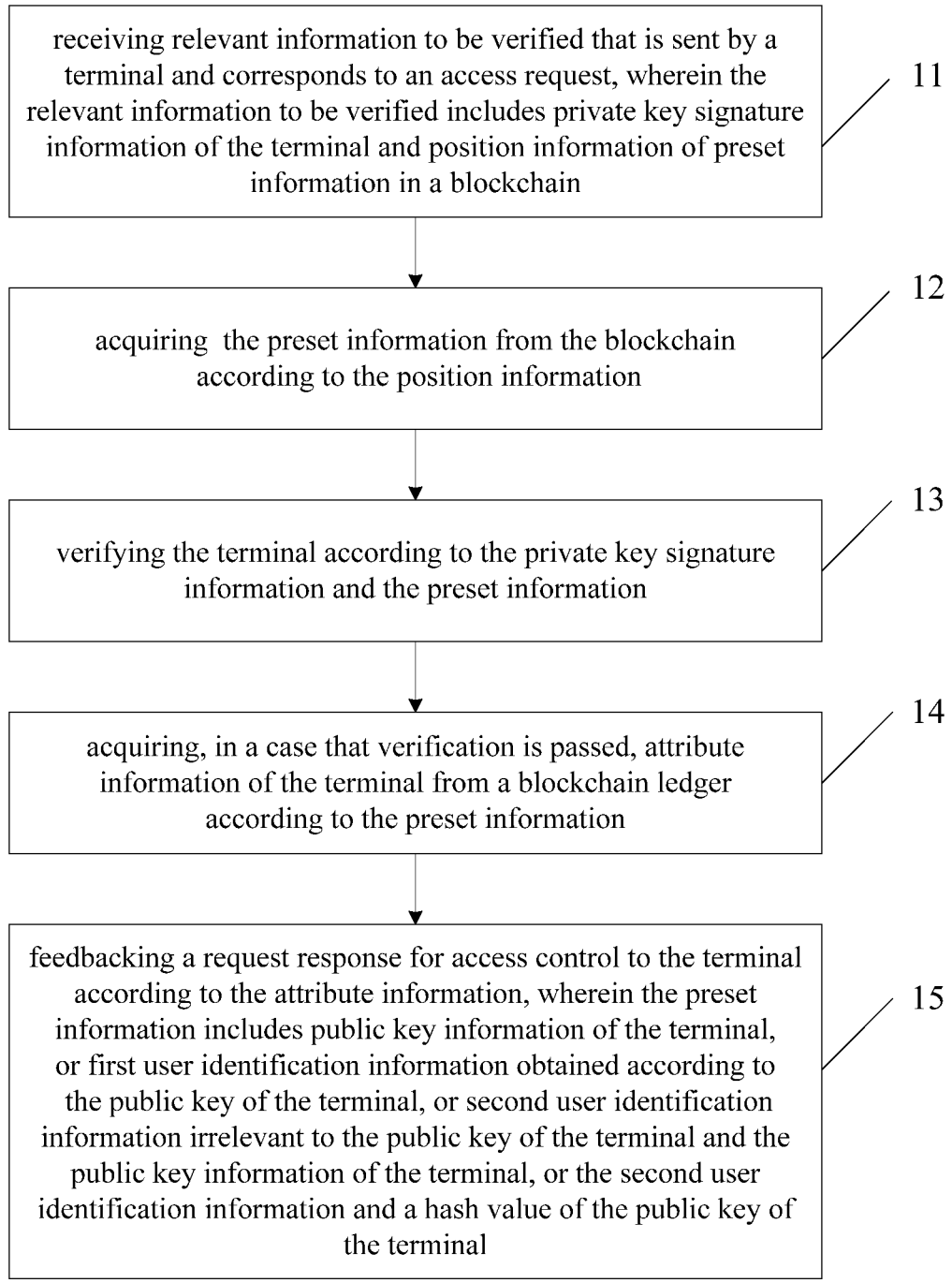
FIG. 1 is a first flowchart of an access control method according to an embodiment of the present disclosure.

The present disclosure aims at the problem on a single point of failure caused by traditional authentication servers being attacked by DDoS in related technologies, and provides an access control method, applied to a first network side device, as shown in FIG. 1, which includes:

- step 11: receiving relevant information to be verified that is sent by a terminal and corresponds to an access request, wherein the relevant information to be verified includes private key signature information of the terminal and position information of preset information in the blockchain;
- step 12: acquiring the preset information from the blockchain according to the position information;
- step 13: verifying the terminal according to the private key signature information and the preset information;
- step 14: acquiring, in a case that verification is passed, attribute information of the terminal from a blockchain ledger according to the preset information;
- step 15: feedbacking a request response for access control to the terminal according to the attribute information, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

Specifically, step 15 may be to feedback a request response for access control to the terminal according to the attribute information and terminal identification information; the terminal identification information may be the above-mentioned first terminal identification information, second terminal identification information or third terminal identification information.

The access control method provided by the embodiments of the present disclosure includes: receiving the relevant information to be verified corresponding to the access request sent by the terminal, wherein the relevant information to be verified includes the private key signature information of the terminal and position information of preset information in the blockchain; acquiring the preset information from the blockchain according to the position information; verifying the terminal according to the private key signature information and the preset information; acquiring, in a case that verification is passed, attribute information of the terminal from a blockchain ledger according to the preset information; feedbacking a request response for access control to the terminal according to the attribute information, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal; the method can support and achieve the scheme of using blockchain for access control, and provide attribute verification services to customers in the form of blockchain, can avoid the similar problem on a single point of failure caused by traditional authentication servers being attacked by DDoS.

The receiving relevant information to be verified corresponding to the access request sent by the terminal includes: receiving the access request sent by the terminal, wherein relevant information to be verified is carried in the access request; or, receiving the access request sent by the terminal; feedbacking, according to the access request, a random number to the terminal; receiving relevant information to be verified sent by the terminal according to the random number.

In the embodiment of the present disclosure, the verifying, in the case that the preset information includes public key information of the terminal, the terminal according to the private key signature information and the preset information, includes: using the public key information to verify the private key signature information; the obtaining, in the case that verification is passed, attribute information of the terminal from the blockchain ledger according to the preset information includes: obtaining, in a case that the verification is passed, corresponding third terminal identification information from the blockchain ledger according to the public key information; obtaining, in a case that the third terminal identification information is obtained, attribute information corresponding to the third terminal identification information from the blockchain ledger as attribute information of the terminal.

The feedbacking, according to the attribute information, the request response for access control to the terminal may include: feedbacking, according to the third terminal identification information and attribute information, the request response for access control to the terminal.

In an embodiment of the present disclosure, the verifying, in the case that the preset information includes the first terminal identification information, the terminal according to the private key signature information and the preset information, includes: obtaining, according to the first terminal identification information, the public key information to be verified and the stored public key information of the terminal from the blockchain ledger; verifying, according to the public key information of the terminal, the public key information to be verified and the private key signature information; obtaining, in the case that verification is passed, attribute information of the terminal from the blockchain ledger according to the preset information comprises: obtaining, in the case that the verification is passed, attribute information of the terminal from the blockchain ledger according to the first terminal identification information.

The feedbacking, according to the attribute information, the request response for access control to the terminal includes: feedbacking, according to the first terminal identification information and attribute information, the request response for access control to the terminal.

In the embodiment of the present disclosure, the verifying, in the case that the preset information includes the second terminal identification information and the public key information, the terminal according to the private key signature information and the preset information, includes: using the public key information in the preset information to verify the private key signature information; obtaining, according to the second terminal identification information, the stored public key information of the terminal from the blockchain ledger; and verifying, according to the acquired public key information of the terminal, the public key information in the preset information; or, using the public key information in the preset information to verify the private key signature information; obtaining, according to the second terminal identification information, the stored hash value of the public key of the terminal from the blockchain ledger; obtaining, according to the public key information in the preset information, the hash value to be verified; and verifying, according to the obtained hash value of the public key of the terminal, the hash value to be verified.

The verifying, in the case that the preset information includes the second terminal identification information and the hash value of the public key, the terminal according to the private key signature information and the preset information, includes: obtaining, according to the second terminal identification information, the stored public key information of the terminal from the blockchain ledger; obtaining, according to the hash value of the public key in the preset information, the public key information to be verified; verifying, according to the public key information to be verified, the private key signature information; and verifying, according to the acquired public key information of the terminal, the public key information to be verified.

In the embodiment of the present disclosure, the obtaining, in a case that verification is passed, attribute information of the terminal from the blockchain ledger according to the preset information includes: obtaining, in a case that the verification is passed, attribute information of the terminal from the blockchain ledger according to the second terminal identification information.

The feedbacking, according to the attribute information, the request response for access control to the terminal includes: feedbacking, according to the second terminal identification information and attribute information, the request response for access control to the terminal.

In the embodiment of the present disclosure, the private key signature information includes first signature information on a timestamp using the private key of the terminal, or second signature information of the random number on the first network side device in response to the access request sent by using the private key of the terminal.

In a case that the private key signature information includes the first signature information, the relevant information to be verified further includes the timestamp; the verifying the terminal according to the private key signature information and the preset information includes: confirming whether the timestamp is within a validity period; verifying, in a case that the timestamp is within the validity period, the terminal according to the private key signature information and the preset information.

Specifically, whether the timestamp is within the validity period may be determined according to the confirmation of the timestamp itself, but the present disclosure is not limited thereto.

In an embodiment of the present disclosure, the preset information further includes validity period information of the first information; the first information includes at least one of the attribute information, the first terminal identification information and the second terminal identification information; the verifying the terminal according to the private key signature information and the preset information includes: confirming, according to the validity period information, whether the first information is within the validity period; verifying, in a case that the first information is within the validity period, the terminal according to the private key signature information and other information except the validity period information in the preset information.

Regarding "confirming, according to the validity period information, whether the first information is within the validity period;" may specifically be: first, checking the validity period information in the preset information according to the validity period information stored on the blockchain ledger (the validity period information of the second information); and confirming, in a case that the verification is passed, whether the first information is within the validity period according to the validity period information.

At least one authentication information related to the terminal is stored in the blockchain ledger as encrypted information encrypted with a first key; the relevant information to be verified further includes the first key encrypted with the public key of the first network side device; prior to the feeding back, according to the attribute information, the request response for access control to the terminal, the method further includes: using the private key of the first network side device to decrypt the first key encrypted by the public key to obtain the first key; decrypting, according to the first key, the encrypted information obtained from the blockchain ledger to obtain the at least one authentication information, wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Further, the at least one authentication information further includes: a timestamp corresponding to the terminal; and/or, validity period information of a second information, wherein the timestamp is a timestamp of a first signature information obtained by signing with the private key of the terminal; the second information includes at least one of the attribute information, first terminal identification information, second terminal identification information, and third terminal identification information.

Figure 2:
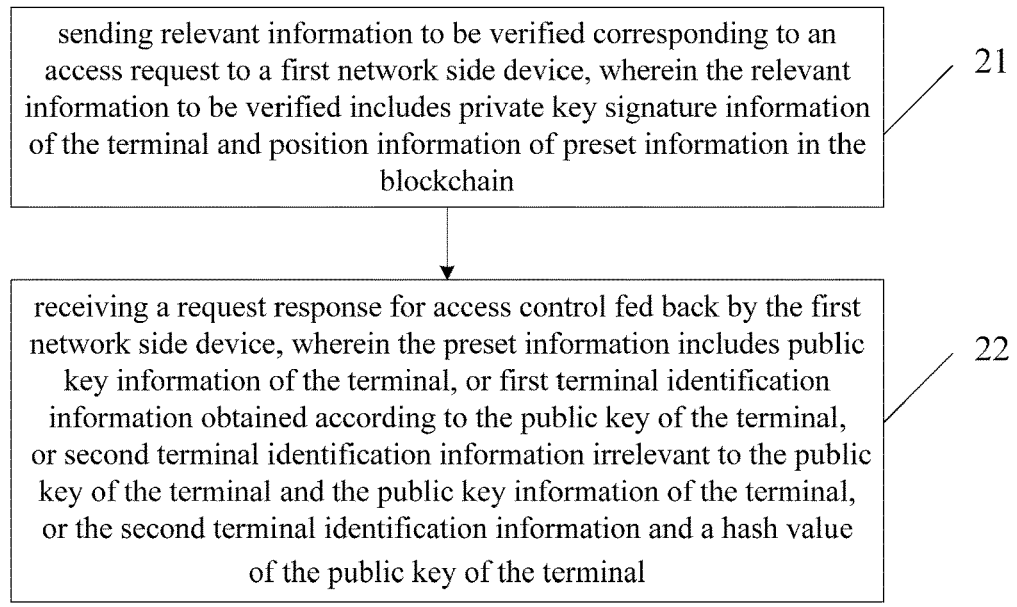
FIG. 2 is a second flowchart of the access control method according to an embodiment of the present disclosure.

An embodiment of the present disclosure also provides an access control method, applied to a terminal, as shown in FIG. 2, which includes:

step 21: sending relevant information to be verified corresponding to an access request to a first network side device, wherein the relevant information to be verified includes private key signature information of the terminal and position information of preset information in the blockchain;

step 22: receiving a request response for access control feedback by the first network side device, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

The access control method provided by the embodiments of the present disclosure includes: sending relevant information to be verified corresponding to an access request to a first network side device, wherein the relevant information to be verified includes private key signature information of the terminal and position information of preset information in the blockchain; receiving a request response for access control feedback by the first network side device, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal; the method can support and achieve the scheme of using blockchain for access control, and provide attribute verification services to customers in the form of blockchain, can avoid the similar problem on a single point of failure caused by traditional authentication servers being attacked by DDoS.

The sending the relevant information to be verified corresponding to the access request to the first network side device includes: sending the access request to the first network side device, wherein the relevant information to be verified is carried in the access request; or, sending the access request to the first network side device; receiving a random number feedback by the first network side device according to the access request; sending, according to the random number, relevant information to be verified to the first network side device.

In the embodiment of the present disclosure, the private key signature information includes first signature information on a timestamp using the private key of the terminal, or second signature information of the random number on the first network side device in response to the access request sent by using the private key of the terminal.

In a case that the private key signature information includes the first signature information, the relevant information to be verified further includes the timestamp.

In the embodiment of the present disclosure, the preset information further includes validity period information of the first information; the first information includes at least one of the attribute information of the terminal, the first terminal identification information and the second terminal identification information.

At least one authentication information related to the terminal is stored in the blockchain ledger as encrypted information encrypted with a first key; the relevant information to be verified further includes the first key encrypted with the public key of the first network side device; wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Further, the at least one authentication information further includes: a timestamp corresponding to the terminal; and/or, validity period information of the second information, wherein the timestamp is a timestamp of the first signature information obtained by signing with the private key of the terminal; the second information includes at least one of the attribute information, first terminal identification information, second terminal identification information, and third terminal identification information.

In the embodiment of the present disclosure, prior to the sending the relevant information to be verified corresponding to the access request to the first network side device, the method further includes: sending information to be authenticated of the terminal to a first blockchain node, wherein the information to be authenticated includes user credential information and/or attribute information; the user credential information includes terminal identification information.

Figure 3:
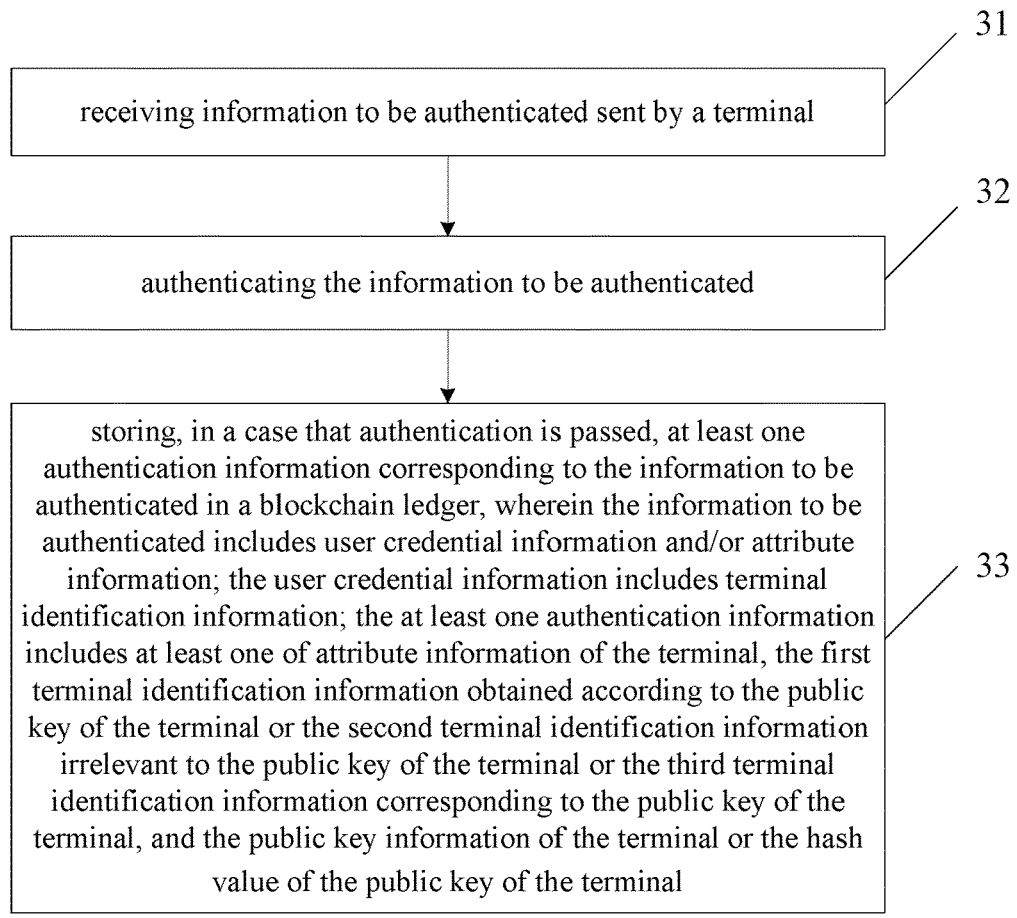
FIG. 3 is a third flowchart of the access control method according to an embodiment of the present disclosure.

The embodiment of the present disclosure also provides an access control method, applied to the first blockchain node, as shown in FIG. 3, which includes:

step 31: receiving information to be authenticated sent by a terminal;

step 32: authenticating the information to be authenticated;

step 33: storing, in a case that authentication is passed, at least one authentication information corresponding to the information to be authenticated in a blockchain ledger, wherein the information to be authenticated includes user credential information and/or attribute information; the user credential information includes terminal identification information; the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Step 32 may specifically be: using a consensus mechanism to authenticate the information to be authenticated.

The access control method provided by the embodiments of the present disclosure includes: receiving information to be authenticated sent by a terminal; authenticating the information to be authenticated; storing, in a case that authentication is passed, at least one authentication information corresponding to the information to be authenticated in a blockchain ledger, wherein the information to be authenticated includes user credential information and/or attribute information; the user credential information includes terminal identification information; the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal; the method can support and achieve the scheme of using blockchain for access control, and provide attribute verification services to customers in the form of blockchain, can avoid the similar problem on a single point of failure caused by traditional authentication servers being attacked by DDoS.

Further, the at least one authentication information further includes: a timestamp corresponding to the terminal; and/or, validity period information of a second information, wherein the timestamp is a timestamp of the first signature information obtained by signing with the private key of the terminal; the second information includes at least one of the attribute information, first terminal identification information, second terminal identification information, and third terminal identification information.

The storing, in a case that the authentication is passed, at least one authentication information corresponding to the information to be authenticated in the blockchain ledger includes: generating randomly a first key for encryption; using the first key to encrypt the at least one authentication information for storing in the blockchain ledger.

Further, after the generating randomly the first key for encryption, the method further includes: using the public key of the terminal to encrypt the first key for storing in the blockchain ledger.

For the case of using multi-platform authentication: in the embodiment of the present disclosure, the authenticating the information to be authenticated includes: sending, according to a first preset policy, user credential information in the information to be authenticated to at least one second network side device for authentication; receiving a first authentication result feedback by the at least one second network side device and corresponding third signature information; obtaining, according to a second preset policy, the first authentication result and the third signature information, a first final result of whether the user credential information is authenticated and passed; and/or, the authenticating the information to be authenticated includes: sending, according to a first preset policy, attribute information in the information to be authenticated to at least one third network side device for authentication; receiving a second authentication result feedback by the at least one third network side device and corresponding fourth signature information; obtaining, according to a third preset policy, the second authentication result and the fourth signature information, a second final result of whether the attribute information is authenticated and passed.

The first preset policy, the third preset policy and/or the third preset policy are preset policies or policies agreed in smart contracts.

For the case of adopting multi-platform authentication through an intermediate node: in the embodiment of the present disclosure, the authenticating the information to be authenticated includes: sending the information to be authenticated to a second blockchain node; receiving a first authentication result corresponding to the user credential information in the information to be authenticated feedback by the second blockchain node and corresponding third signature information; and obtaining, according to a second preset policy, the first authentication result and third signature information, a first final result of whether the user credential information is authenticated and passed; and/or, receiving a second authentication result corresponding to the attribute information in the information to be authenticated feedback by the second blockchain node and corresponding fourth signature information; and obtaining, according to a third preset policy, the second authentication result and fourth signature information, a second final result of whether the attribute information is authenticated and passed.

The third preset policy and/or the third preset policy is a preset policy or a policy agreed in a smart contract.

Figure 4:
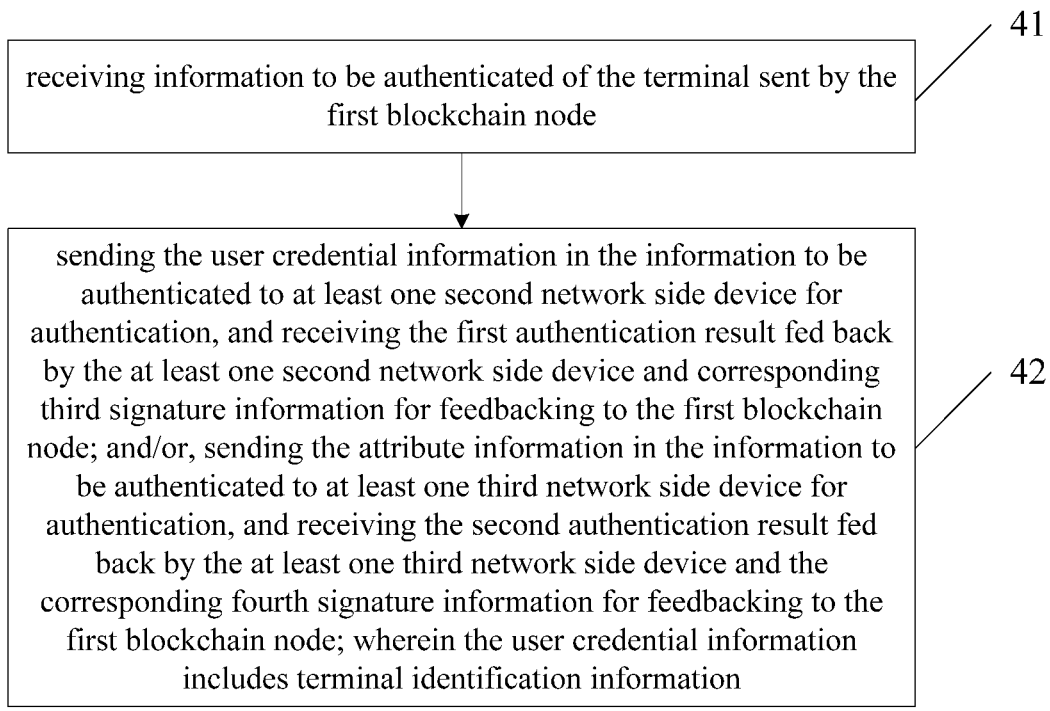
FIG. 4 is a fourth flowchart of the access control method according to an embodiment of the present disclosure.

The embodiment of the present disclosure also provides an access control method, applied to the second blockchain node, as shown in FIG. 4, which includes:
- step 41: receiving information to be authenticated of the terminal sent by the first blockchain node;
- step 42: sending the user credential information in the information to be authenticated to at least one second network side device for authentication, and receiving the first authentication result feedback by the at least one second network side device and corresponding third signature information for feedbacking to the first blockchain node; and/or, sending the attribute information in the information to be authenticated to at least one third network side device for authentication, and receiving the second authentication result feedback by the at least one third network side device and the corresponding fourth signature information for feedbacking to the first blockchain node; wherein the user credential information includes terminal identification information.

The access control method provided by the embodiments of the present disclosure includes: receiving information to be authenticated of the terminal sent by the first blockchain node; sending the user credential information in the information to be authenticated to at least one second network side device for authentication, and receiving the first authentication result feedback by the at least one second network side device and corresponding third signature information for feedbacking to the first blockchain node; and/or, sending the attribute information in the information to be authenticated to at least one third network side device for authentication, and receiving the second authentication result feedback by the at least one third network side device and the corresponding fourth signature information for feedbacking to the first blockchain node; wherein the user credential information includes terminal identification information; the method can support and achieve the scheme of using blockchain for access control, and provide attribute verification services to customers in the form of blockchain, can avoid the similar problem on a single point of failure caused by traditional authentication servers being attacked by DDoS.

Figure 5:
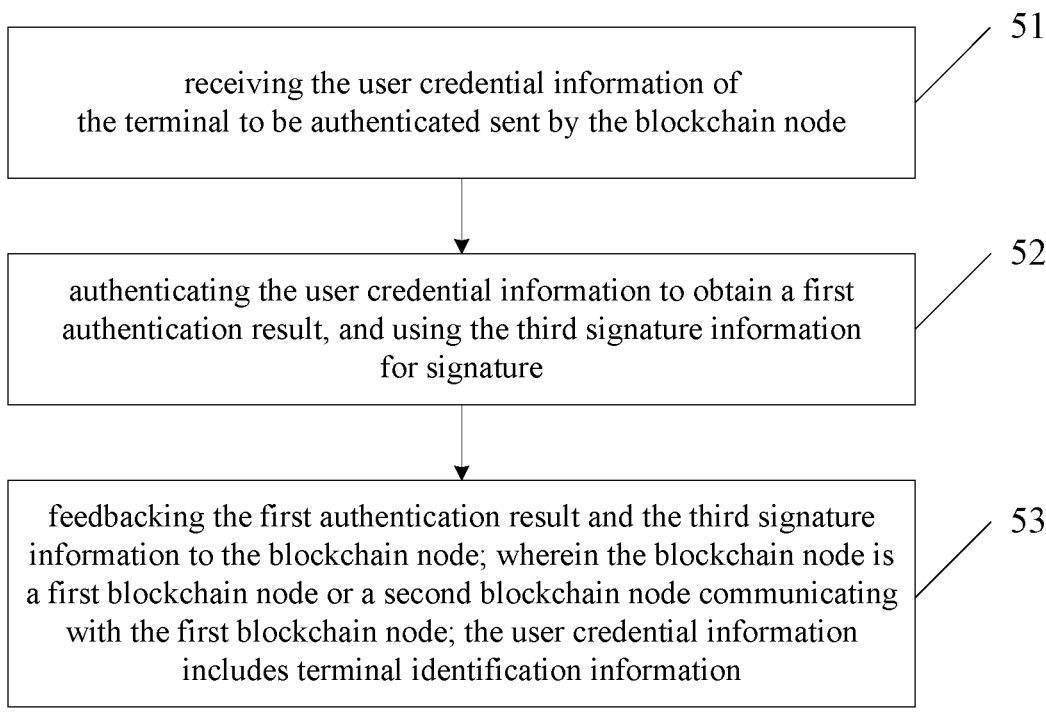
FIG. 5 is a fifth flowchart of the access control method according to an embodiment of the present disclosure.

An embodiment of the present disclosure also provides an access control method, applied to a second network side device, as shown in FIG. 5, which includes:
- step 51: receiving the user credential information of the terminal to be authenticated sent by the blockchain node;
- step 52: authenticating the user credential information to obtain a first authentication result, and using the third signature information for signature;
- step 53: feedbacking the first authentication result and the third signature information to the blockchain node; wherein the blockchain node is a first blockchain node or a second blockchain node communicating with the first blockchain node; the user credential information includes terminal identification information.

The access control method provided by the embodiments of the present disclosure includes: receiving the user credential information of the terminal to be authenticated sent by the blockchain node; authenticating the user credential information to obtain a first authentication result, and using the third signature information for signature; feedbacking the first authentication result and the third signature information to the blockchain node; wherein the blockchain node is a first blockchain node or a second blockchain node communicating with the first blockchain node; the user credential information includes terminal identification information; the method can support and achieve the scheme of using blockchain for access control, and provide attribute verification services to customers in the form of blockchain, can avoid the similar problem on a single point of failure caused by traditional authentication servers being attacked by DDoS.

Figure 6:
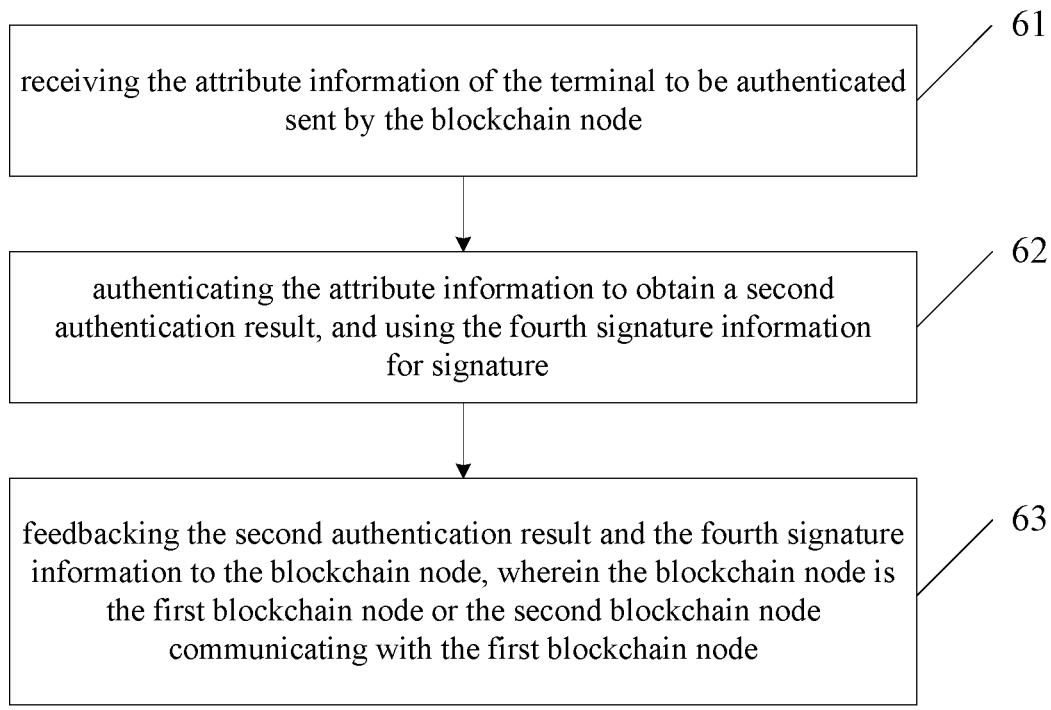
FIG. 6 is a sixth flowchart of the access control method according to an embodiment of the present disclosure.

An embodiment of the present disclosure also provides an access control method, applied to a third network side device, as shown in FIG. 6, which includes:
- step 61: receiving the attribute information of the terminal to be authenticated sent by the blockchain node;
- step 62: authenticating the attribute information to obtain a second authentication result, and using the fourth signature information for signature;
- step 63: feedbacking the second authentication result and the fourth signature information to the blockchain node, wherein the blockchain node is the first blockchain node or the second blockchain node communicating with the first blockchain node.

The access control method provided by the embodiments of the present disclosure includes: receiving the attribute information of the terminal to be authenticated sent by the blockchain node; authenticating the attribute information to obtain a second authentication result, and using the fourth signature information for signature; feedbacking the second authentication result and the fourth signature information to the blockchain node, wherein the blockchain node is the first blockchain node or the second blockchain node communicating with the first blockchain node; the method can support and achieve the scheme of using blockchain for access control, and provide attribute verification services to customers in the form of blockchain, can avoid the similar problem on a single point of failure caused by traditional authentication servers being attacked by DDoS.

The access control method provided by the embodiments of the present disclosure will be further described below with reference to multiple sides such as the first network side device, the second network side device, the third network side device, the terminal, the first blockchain node, and the second blockchain node.

In view of the above-mentioned technical problems, the embodiment of the present disclosure provides an access control method, which can be specifically implemented as a method of implementing access control using blockchain, refers to provide authentication and verification services to customers in the form of blockchain, thereby avoiding the problem on a single point of failure caused by traditional authentication servers being attacked by DDoS.

Figure 7:
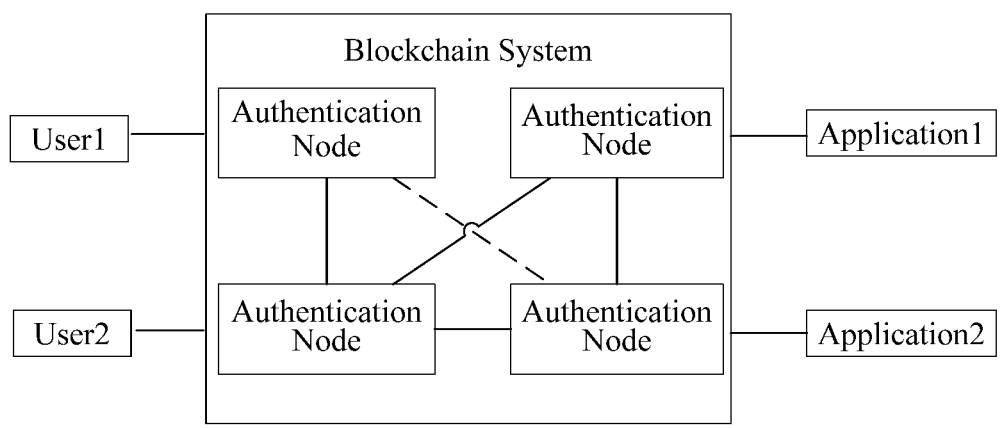
FIG. 7 is a schematic view of an implementation architecture of the access control method according to an embodiment of the present disclosure.

The implementation architecture of the access control method provided by the embodiments of the present disclosure can be specifically shown in FIG. 7, which involves: the user (corresponding to the above-mentioned terminal), the blockchain system (corresponding to the above-mentioned blockchain, including the first blockchain node and second blockchain node) and applications (corresponding to the above-mentioned first network side device); the blockchain network nodes in the specific blockchain system are composed of multiple authentication nodes, wherein the authentication nodes are mainly responsible for authenticating user identity (corresponding to the above-mentioned user credential information), and authenticating the attribute of user (corresponding to the above-mentioned attribute information), and recording the authentication result in the blockchain ledger; in a case that the user accesses the service system (corresponding to the above-mentioned first network side device), the service system inquires the user identity and attribute information in the blockchain. Both the user (client) and the service system (specifically, the application (server) in the system) have their own public key and private key.

In this scheme, the user (client) first submits an authentication request (corresponding to the above-mentioned information to be authenticated) to the blockchain system, which includes identity authentication information (corresponding to the above-mentioned user credential information) and attribute information, the authentication nodes in the blockchain system respectively authenticate the identity authentication information and attribute information, and record the authenticated and consensus information into the blockchain ledger. The main process is as follows:

Operation 1. the user (client) submits identity authentication information and/or attribute information to the blockchain system;

Operation 2. the blockchain node (that is, the above-mentioned first blockchain node) authenticates (correctness of these information may be specifically authenticated) the above-mentioned information (identity authentication information and/or attribute information);

Operation 3. after the above-mentioned information is authenticated and consensused by the blockchain node, the blockchain node will record the user ID (corresponding to the above-mentioned user credential information, specifically corresponding to the above-mentioned first terminal identification information, second terminal identification information or third terminal identification information) and/or hash value of user public key and/or user public key, user attribute information (that is, the attribute information of the above-mentioned terminal), validity period (that is, the above-mentioned validity period information), etc. in the blockchain ledger;

Optionally, in order to prevent information leakage, the data may be encrypted and stored. For example: the data plaintext that needs to be recorded is denoted as info, and the ciphertext recorded in the blockchain ledger is:

(Epk_C(K), Ek(info)), wherein pk_C is the public key of user, wherein E represents encryption, the subscript of E represents the key used, and the contents in brackets represent data; K is the first key randomly generated by the blockchain node.

Operation 4. The user initiates an access request to the application server (corresponding to the above-mentioned first network side device):
- a) Method 1 (Timestamp Signature): includes the timestamp, the signature of the user private key on the timestamp (that is, the above-mentioned first signature information), the locations (that is, the above-mentioned position information) of the user ID and/or the hash value of the user public key and/or the user public key, user attribute information, validity period and other information in the blockchain, in a case that the user public key is not recorded in operation 3 (but the hash value is recorded), then the user public key also needs to be carried in this operation.
- b) Method 2 (random number signature): the request does not carry user information, the application server returns a random number, and the user signs the random number with the private key (that is, the above-mentioned second signature information), and sends the locations of the signature, user ID and/or hash value of user public key and/or user public key, user attribute information, validity period and other information in the blockchain to the application server, in a case that the user public key is not recorded in operation 3, then the user public key also needs to be carried in this operation.

In addition, in a case that the data is encrypted and stored, in the above-mentioned two methods, the access request should also include a decryption key (that is, the above-mentioned first key encrypted with the public key of the first network side device):

(Epk_S(K)), wherein pk_S is the public key of the application server.

Operation 5. the application server inquires relevant information in the blockchain ledger to verify the user (client).
  a) Method 1 (timestamp signature): using the user public key to verify whether the signature on the timestamp is correct, whether the timestamp is within the validity period, and verifying whether the user public key or hash value is consistent (or matches) with that recorded in the ledger. In a case that the verification is successful, it means that the user is the user in the ledger, and the attribute information recorded in the ledger is the attribute of the user, the application server may further use the attribute and user ID to perform access authorization (control access).
  b) Method 2 (random number signature): using the user public key to verify whether the signature on the random number is correct, and verifying whether the user public key or hash value is consistent (or matches) with that recorded in the ledger. In a case that the verification is successful, it means that the user is the user in the ledger, and the attribute information recorded in the ledger is the attribute of the user, and the application server may further use the attribute and user ID to perform access authorization.

In addition, in a case that the data is encrypted and stored, in the above-mentioned two methods, the application server should also use the server private key to performing the decryption for obtaining K, and further decrypt the ciphertext in the ledger;

DK(Ek(info)), obtaining info, that is, user information (user ID) and attribute information, wherein D represents decryption.

Figure 8A:
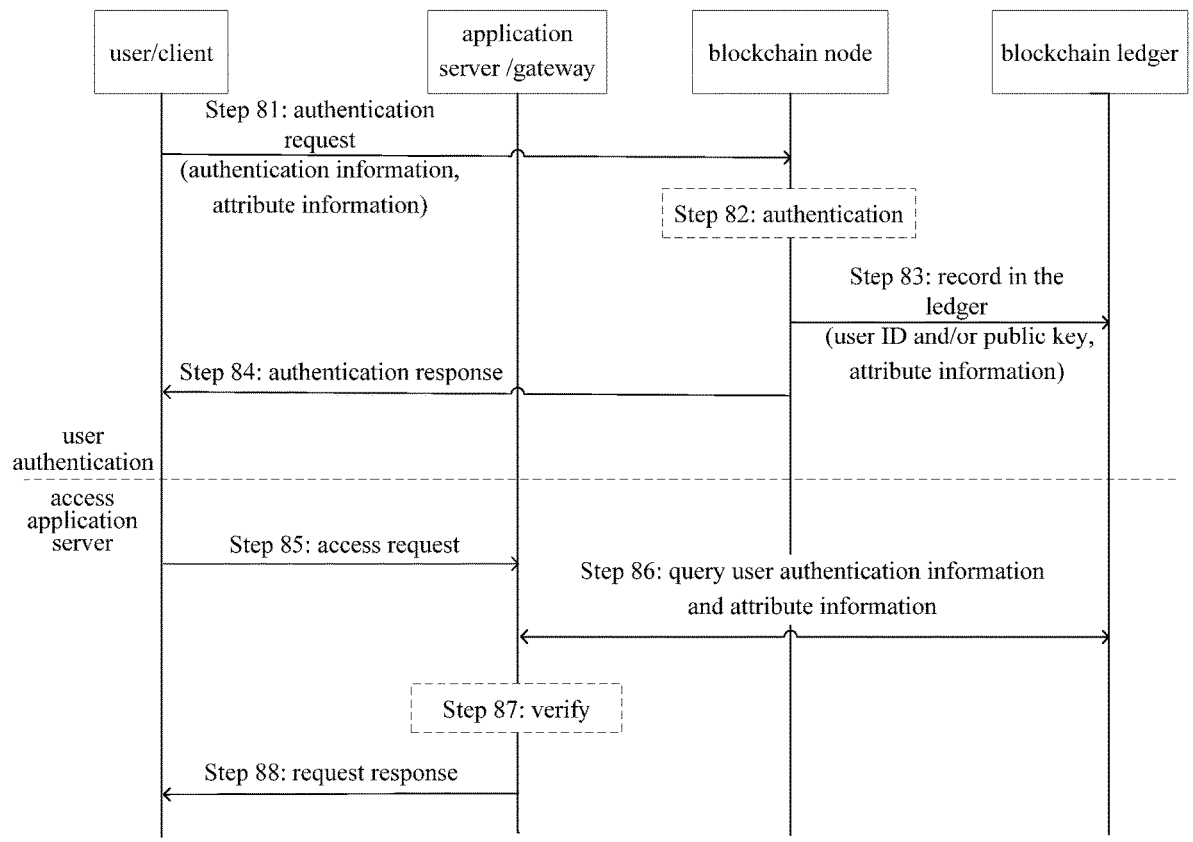
FIG. 8a is a first schematic view of a specific implementation flow of the access control method according to an embodiment of the present disclosure.

Specifically, in some embodiments, the access control method provided by the embodiments of the present disclosure may be shown in FIG. 8a (the first network side device may be an application server (gateway) exemplarily), which includes:
  step 81: sending, by the user (client), an authentication request (corresponding to the above-mentioned information to be authenticated) to the blockchain node (i.e., the above-mentioned first blockchain node);
  step 82: performing, by the blockchain node, the authentication operation;
  step 83: performing, in a case that the authentication is passed, the record in the blockchain ledger (user ID and/or public key, attribute information);
  step 84: feedbacking, by the blockchain node, the authentication response to the user (client);
  step 85: sending, by the user (client), an access request to the application server (gateway);
  step 86: inquiring, by the application server (gateway), the blockchain ledger for user authentication information and attribute information;
  step 87: verifying, by the application server (gateway), the user (client) according to the inquired information;
  step 88: feedbacking, by the application server (gateway), the request response to the user (client).

Figure 8B:
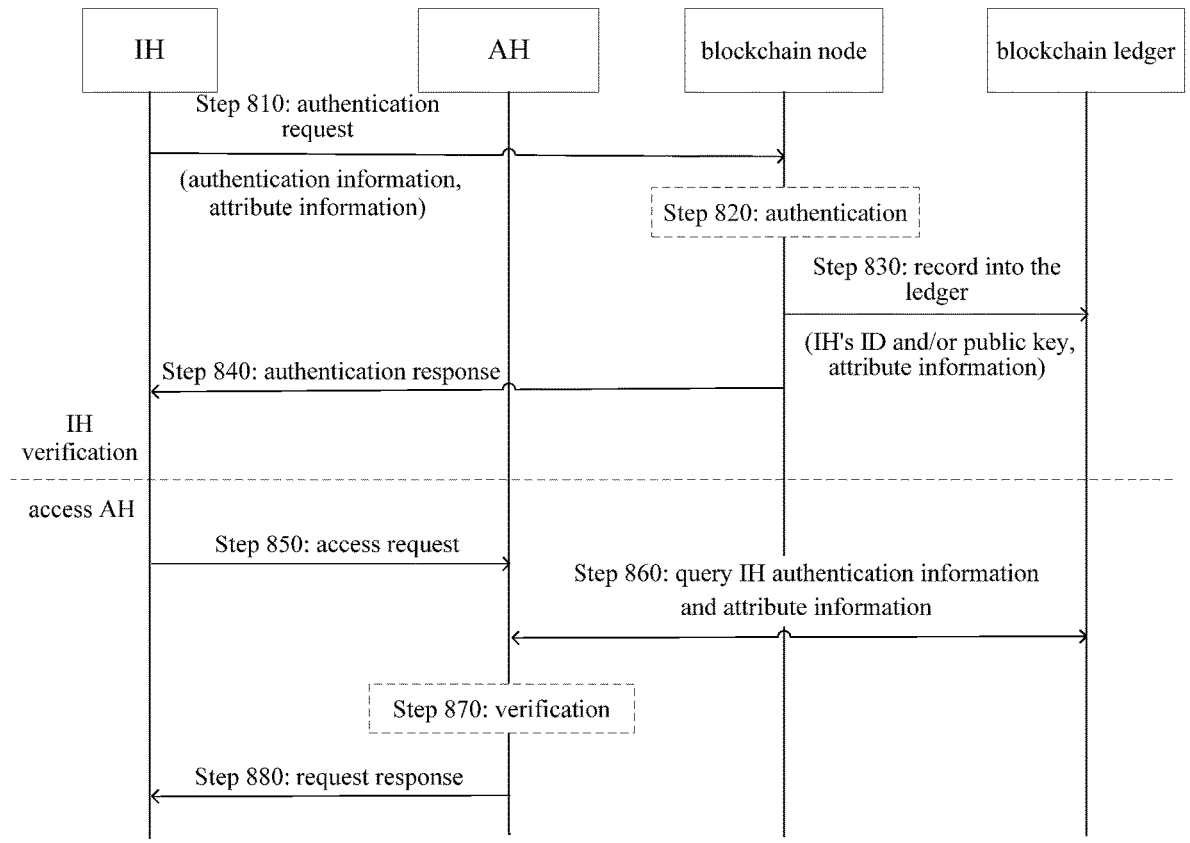
FIG. 8b is a second schematic view of the specific implementation flow of the access control method according to an embodiment of the present disclosure.

In some other embodiments, the access control method of the embodiments of the present disclosure may also be applied to a software-defined perimeter (Software Defined Perimeter, SDP) scenario, and the specific implementation process may refer to FIG. 8b (the first network side device may be accepting SDP hosts (Accepting SDP Hosts, AH) exemplarily), the method includes:
  step 810: sending, by initiating SDP hosts, (Initiating SDP Hosts, IH) an authentication request (corresponding to the above-mentioned information to be authenticated) to the blockchain node (i.e., the above-mentioned first blockchain node);
  step 820: performing, by the blockchain node, an authentication operation;
  step 830: performing, in a case that the authentication is passed, the record in the blockchain ledger (IH's ID and/or public key, attribute information);
  step 840: feedbacking, by the blockchain node, an authentication response to IH;
  step 850: sending, by IH, an access request to AH;
  step 860: inquiring, by AH, the blockchain ledger for IH authentication information and attribute information;
  step 870: verifying, by AH, IH according to the inquired information;
  step 880: feedbacking, by AH, the request response to IH.

In addition, in the above-mentioned operation 2 authentication process, in a case that identity authentication information and attribute information need to be authenticated by different nodes, the specific process may be as follows.

Figure 9:
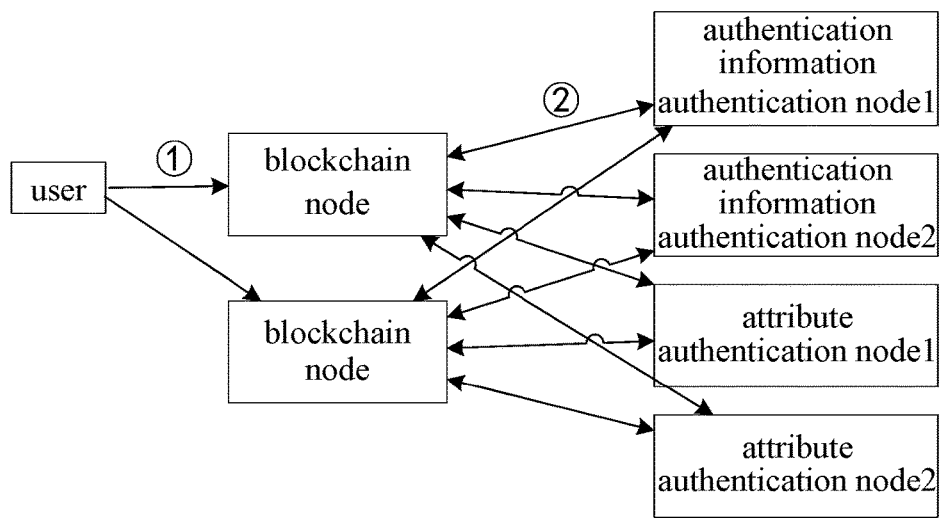
FIG. 9 is a first schematic view of an authentication architecture of information to be authenticated according to an embodiment of the present disclosure.

Method 1, this method needs to formulate an authentication policy (including the above-mentioned first preset policy, second preset policy and third preset policy) for authentication information (i.e., identity authentication information) and attribute information, and the policy should include information forwarding policy (i.e., the above-mentioned first preset policy), as shown in FIG. 9:
  a) after receiving the identity authentication information and attribute information, the blockchain nodes respectively forward the authentication information and attribute information to the corresponding authentication nodes (corresponding to the above-mentioned sending the user credential information in the information to be authenticated to at least one second network side device for authentication, sending the attribute information in the information to be authenticated to at least one third network side device for authentication) according to the policy; different authentication nodes can authenticate different authentication information or attribute information, such as attribute authentication node 1 authenticates attribute 1, and attribute authentication node 2 authenticates attribute 2, which is not limited here.
  b) Authentication information authentication node and attribute authentication node respectively authenticate the above-mentioned information and sign the authentication results;
  Specifically, the authentication information authentication node may be an authentication server; for example, a user submits username and password authentication information, and the blockchain node forwards the authentication information to the authentication information authentication node, and the authentication information authentication node authenticates the username and password. Here, the authentication information authentication nodes 1 and 2 may be WeChat and Alipay, whichever password the user submits, the blockchain node will submit the authentication information to the corresponding authentication information authentication node.

c) The authentication information authentication node and the attribute authentication node return the verification results (corresponding to the above-mentioned first authentication result and second authentication result) and their signatures (corresponding to the above-mentioned third signature information and fourth signature information) on the results;

d) The blockchain node determines the final authentication results (corresponding to the above-mentioned first final result and second final result) according to the received authentication results and signatures.

Figure 10:
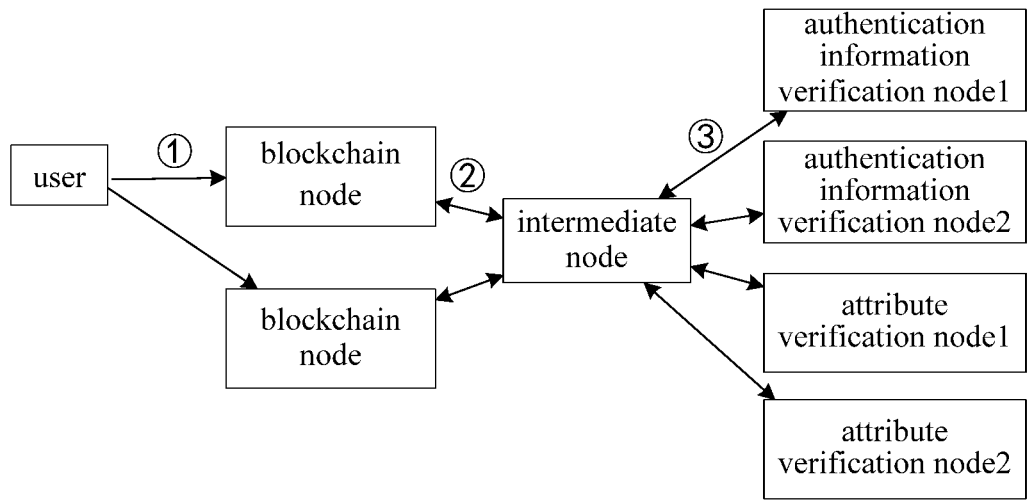
FIG. 10 is a second schematic view of the authentication architecture of information to be authenticated according to an embodiment of the present disclosure.

Method 2, this method requires the use of intermediate node (that is, the above-mentioned second blockchain node), as shown in FIG. 10:

a) After receiving the identity authentication information and attribute information, the blockchain node (that is, the above-mentioned first blockchain node) forwards the authentication information and attribute information to the intermediate node;

b) The intermediate nodes forward the authentication information and attribute information to the corresponding authentication nodes (corresponding to sending the user credential information in the information to be authenticated to at least one second network side device for authentication, sending the attribute information in the information to be authenticated to at least one third network side device for authentication); different authentication nodes can authenticate different authentication information or attribute information, for example, attribute authentication node 1 authenticates attribute 1, and attribute authentication node 2 authenticates attribute 2, which will not be described here limited.

c) Authentication information authentication node and attribute authentication node respectively authenticate the above-mentioned information and sign the authentication results;

Specifically, the authentication information authentication node may be an authentication server; for example, a user submits username and password authentication information, and the blockchain node forwards the authentication information to the authentication information authentication node, and the authentication information authentication node authenticates the username and password. Here, the authentication information authentication nodes 1 and 2 may be WeChat and Alipay. Whichever password the user submits, the blockchain node will submit the authentication information to the corresponding authentication information authentication node.

d) The authentication information authentication node and the attribute authentication node send the authentication results (corresponding to the above-mentioned first authentication result and second authentication result) and their signatures (corresponding to the above-mentioned third signature information and fourth signature information) on the results to the intermediate node;

e) The blockchain node obtains the authentication results and signatures from the intermediate node, and determines the final authentication results (corresponding to the above-mentioned first final result and second final result).

This method may reduce overhead and information interaction.

The solutions provided by the embodiments of the present disclosure are illustrated below.

Example 1: Unified Authentication (this Example Provides Another Implementation Method for the Above-Mentioned Operation 5)

In this example, the blockchain acts as a unified authentication platform, and the user submits an authentication request to the blockchain system, and the blockchain node (corresponding to the above-mentioned first blockchain node) authenticates the user, and records the user information, public key information and attribute information in the blockchain ledger. In a case that a user submits an access request to the application system, the application system needs to verify the user signature to ensure the correctness of the user public key, and then inquiry the user information and attribute information in the blockchain according to the public key to realize user authentication.

1. The user initiates an authentication request to the blockchain, wherein the information to be authenticated is carried in the authentication request;
2. The blockchain system authenticates the information to be authenticated provided by the user, and records, after the authentication is passed, the user's identity or attribute information in the blockchain ledger;
3. The user initiates an access request to the application system, wherein the signature of the user private key on the timestamp is carried in the access request, or the application system sends a random number to the user, and the user signs the random number with the private key for sending to the application system. Optionally, the location wherein the user identity or attribute information is recorded in the blockchain may also be carried in the request.
4. In a case that the public key is carried in the access request, the application system may directly use the public key to verify the signature of user, in a case that the signature is correct, the public key may be used to inquiry the user's identity (user ID) and attribute information in the blockchain.
5. The application system may further use this attribute and the identity of the user to perform access authorization.

Example 2: Two-Factor Authentication (Corresponding to Above-Mentioned the Authentication Methods in FIG. 9 and FIG. 10)

In some high-security level of application scenarios, very strict authentication measures are required for user identities, for example, authentication information provided by two or more authentication agencies is required. In this embodiment, the user has authentication information of two authentication platforms (such as WeChat platform and Alipay platform), and the user submits an authentication request to the blockchain system, the request may include authentication data of multiple authentication platforms (such as WeChat platform and Alipay platform), the blockchain node extracts the user authentication data, and sends the user authentication data to the corresponding authentication platform for authentication in the manner shown in FIG. 9 or FIG. 10 respectively, and the authentication platform authenticates the user according to the authentication data of user, and returns the authentication results to the blockchain node. Blockchain nodes process, according to the received authentication results, the authentication results by using preset policy or policy agreed in the smart contract. Since the authentication node can obtain the user authentication results of the above-mentioned two authentication platforms, thereby achieving the two-factor authentication of the user identity.

As can be seen from the above, the solution provided by the embodiments of the present disclosure specifically relates to a blockchain-based access control method: the user (client) submits an authentication request to the blockchain system; the blockchain authenticates the authentication information and attribute information, and records the authenticated and consensus information in the blockchain ledger; when the user accesses the service system, the service system inquiries the user identity and attribute information in the blockchain.

Specifically, the user (client) submits an authentication request to the blockchain system, wherein the authentication request includes authentication information and attribute information; the blockchain node sends an authentication request to the corresponding authentication information authentication node and attribute information authentication node; the corresponding authentication information authentication node and attribute information authentication node authenticate the request, and feedback authentication result; blockchain node processes authentication result.

To sum up, the solution provided by the embodiments of the present disclosure can avoid the problem on single point of failure; and use the smart contract to realize the authentication and authorization, and the normal service will not be affected in a case that the node is tampered.

Figure 11:
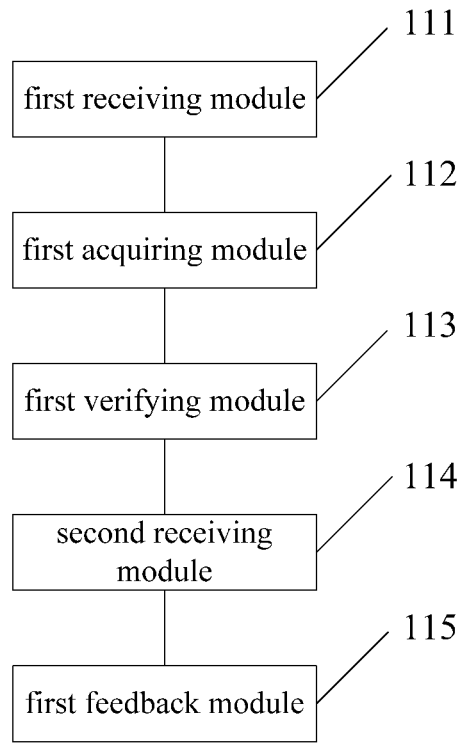
FIG. 11 is a first schematic structural view of an access control apparatus according to an embodiment of the present disclosure.

An embodiment of the present disclosure also provides an access control apparatus, applied to a first network side device, as shown in FIG. 11, which includes:
- a first receiving module 111, configured to receive relevant information to be verified that is sent by a terminal and corresponds to an access request, wherein the relevant information to be verified includes private key signature information of the terminal and position information of preset information in the blockchain;
- a first obtaining module 112, configured to obtain, according to the position information, the preset information from the blockchain;
- a first verifying module 113, configured to verify the terminal according to the private key signature information and the preset information;
- a second receiving module 114, configured to obtain, in a case that verification is passed, attribute information of the terminal from a blockchain ledger according to the preset information;
- a first feedback module 115, configured to feedback, according to the attribute information, a request response for access control to the terminal,
- wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

The access control apparatus provided in the embodiments of the present disclosure implements the following of: receiving the relevant information to be verified corresponding to the access request sent by the terminal, wherein the relevant information to be verified includes the private key signature information of the terminal and position information of preset information in the blockchain; acquiring the preset information from the blockchain according to the position information; verifying the terminal according to the private key signature information and the preset information; acquiring, in a case that verification is passed, attribute information of the terminal from a blockchain ledger according to the preset information; feedbacking a request response for access control to the terminal according to the attribute information, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal; the apparatus can support and achieve the scheme of using blockchain for access control, and provide attribute verification services to customers in the form of blockchain, can avoid the similar problem on a single point of failure caused by traditional authentication servers being attacked by DDoS.

The receiving relevant information to be verified corresponding to the access request sent by the terminal includes: receiving the access request sent by the terminal, wherein relevant information to be verified is carried in the access request; or, receiving the access request sent by the terminal; feedbacking, according to the access request, a random number to the terminal; receiving relevant information to be verified sent by the terminal according to the random number.

In the embodiment of the present disclosure, the verifying, in the case that the preset information includes public key information of the terminal, the terminal according to the private key signature information and the preset information, includes: using the public key information to verify the private key signature information; the obtaining, in the case that verification is passed, attribute information of the terminal from the blockchain ledger according to the preset information includes: obtaining, in a case that the verification is passed, corresponding third terminal identification information from the blockchain ledger according to the public key information; obtaining, in a case that the third terminal identification information is obtained, attribute information corresponding to the third terminal identification information from the blockchain ledger as attribute information of the terminal.

The verifying, in the case that the preset information includes the first terminal identification information, the terminal according to the private key signature information and the preset information, includes: obtaining, according to the first terminal identification information, the public key information to be verified and the stored public key information of the terminal from the blockchain ledger; verifying, according to the public key information of the terminal, the public key information to be verified and the private key signature information; obtaining, in the case that verification is passed, attribute information of the terminal from the blockchain ledger according to the preset information includes: obtaining, in the case that the verification is passed, attribute information of the terminal from the blockchain ledger according to the first terminal identification information.

In the embodiment of the present disclosure, the verifying, in the case that the preset information includes the second terminal identification information and the public key information, the terminal according to the private key signature information and the preset information, includes: using the public key information in the preset information to verify the private key signature information; obtaining, according to the second terminal identification information, the stored public key information of the terminal from the blockchain ledger; and verifying, according to the acquired public key information of the terminal, the public key information in the preset information; or, using the public key information in the preset information to verify the private key signature information; obtaining, according to the second terminal identification information, the stored hash value of the public key of the terminal from the blockchain ledger; obtaining, according to the public key information in the preset information, the hash value to be verified; and verifying, according to the obtained hash value of the public key of the terminal, the hash value to be verified.

The verifying, in the case that the preset information includes the second terminal identification information and the hash value of the public key, the terminal according to the private key signature information and the preset information, includes: obtaining, according to the second terminal identification information, the stored public key information of the terminal from the blockchain ledger; obtaining, according to the hash value of the public key in the preset information, the public key information to be verified; verifying, according to the public key information to be verified, the private key signature information; and verifying, according to the acquired public key information of the terminal, the public key information to be verified.

In the embodiment of the present disclosure, the obtaining, in a case that verification is passed, attribute information of the terminal from the blockchain ledger according to the preset information includes: obtaining, in a case that the verification is passed, attribute information of the terminal from the blockchain ledger according to the second terminal identification information.

The private key signature information includes first signature information on a timestamp using the private key of the terminal, or second signature information of the random number on the first network side device in response to the access request sent by using the private key of the terminal.

In the embodiment of the present disclosure, in a case that the private key signature information includes the first signature information, the relevant information to be verified further includes the timestamp; the verifying the terminal according to the private key signature information and the preset information includes: confirming whether the timestamp is within a validity period; verifying, in a case that the timestamp is within the validity period, the terminal according to the private key signature information and the preset information.

The preset information further includes validity period information of the first information; the first information includes at least one of the attribute information, the first terminal identification information and the second terminal identification information; the verifying the terminal according to the private key signature information and the preset information includes: confirming, according to the validity period information, whether the first information is within the validity period; verifying, in a case that the first information is within the validity period, the terminal according to the private key signature information and other information except the validity period information in the preset information.

In the embodiment of the present disclosure, at least one authentication information related to the terminal is stored in the blockchain ledger as encrypted information encrypted with a first key; the relevant information to be verified further includes the first key encrypted with the public key of the first network side device; the access control apparatus further includes: a first decrypting module, configured to use, prior to the feeding back the request response for access control to the terminal according to the attribute information, the private key of the first network side device to decrypt the first key encrypted by the public key to obtain the first key; a second decrypting module, configured to decrypt, according to the first key, the encrypted information obtained from the blockchain ledger to obtain the at least one authentication information, wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Further, the at least one authentication information further includes: a timestamp corresponding to the terminal; and/or, validity period information of a second information, wherein the timestamp is a timestamp of a first signature information obtained by signing with the private key of the terminal; the second information includes at least one of the attribute information, first terminal identification information, second terminal identification information, and third terminal identification information.

The above-mentioned implementation embodiments of the access control method of the first network side device side are all applicable to the embodiments of the access control apparatus, and can also achieve the corresponding same technical effect.

Figure 12:
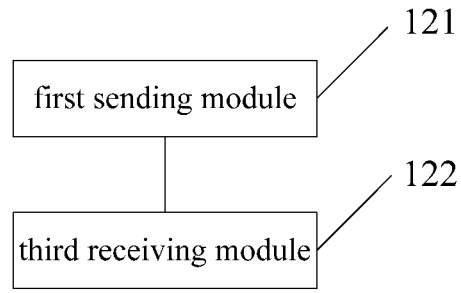
FIG. 12 is a second schematic structural view of the access control apparatus according to an embodiment of the present disclosure.

The embodiment of the present disclosure also provides an access control apparatus, applied to the terminal, as shown in FIG. 12, which includes:
 a first sending module 121, configured to send relevant information to be verified corresponding to an access request to a first network side device, wherein the relevant information to be verified includes private key signature information of the terminal and position information of preset information in the blockchain;
 a third receiving module 122, configured to receive a request response for access control feedback by the first network side device,
 wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

The access control apparatus provided by the embodiments of the present disclosure implements the following of: sending relevant information to be verified corresponding to an access request to a first network side device, wherein the relevant information to be verified includes private key signature information of the terminal and position information of preset information in the blockchain; receiving a request response for access control feedback by the first network side device, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal; the apparatus can support and achieve the scheme of using blockchain for access control, and provide attribute verification services to customers in the form of blockchain, can avoid the similar problem on a single point of failure caused by traditional authentication servers being attacked by DDoS.

The sending the relevant information to be verified corresponding to the access request to the first network side device includes: sending the access request to the first network side device, wherein the relevant information to be verified is carried in the access request; or, sending the access request to the first network side device; receiving a random number feedback by the first network side device according to the access request; sending, according to the random number, relevant information to be verified to the first network side device.

In the embodiment of the present disclosure, the private key signature information includes first signature information on a timestamp using the private key of the terminal, or second signature information of the random number on the first network side device in response to the access request sent by using the private key of the terminal.

In a case that the private key signature information includes the first signature information, the relevant information to be verified further includes the timestamp.

Further, the preset information further includes validity period information of the first information; the first information includes at least one of the attribute information of the terminal, the first terminal identification information and the second terminal identification information.

At least one authentication information related to the terminal is stored in the blockchain ledger as encrypted information encrypted with a first key; the relevant information to be verified further includes the first key encrypted with the public key of the first network side device; wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Further, the at least one authentication information further includes: a timestamp corresponding to the terminal; and/or, validity period information of the second information, wherein the timestamp is a timestamp of the first signature information obtained by signing with the private key of the terminal; the second information includes at least one of the attribute information, first terminal identification information, second terminal identification information, and third terminal identification information.

Further, the access control apparatus further includes: a second sending module, configured to send, prior to the sending the relevant information to be verified corresponding to the access request to the first network side device, information to be authenticated of the terminal to a first blockchain node, wherein the information to be authenticated includes user credential information and/or attribute information; the user credential information includes terminal identification information.

The above-mentioned implementation embodiments of the access control method of the terminal side are all applicable to the embodiments of the access control apparatus, and can also achieve the corresponding same technical effect.

Figure 13:
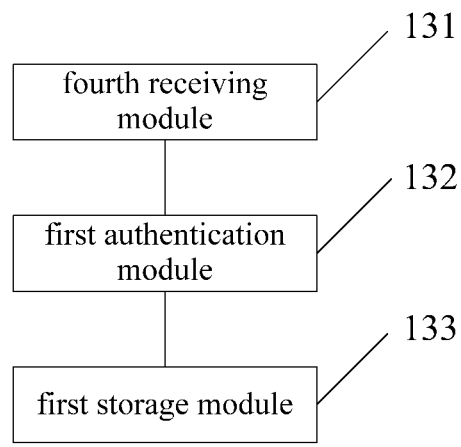
FIG. 13 is a third schematic structural view of the access control apparatus according to an embodiment of the present disclosure.

The embodiment of the present disclosure also provides an access control apparatus, applied to the first blockchain node, as shown in FIG. 13, which includes:
- a fourth receiving module 131, configured to receive information to be authenticated sent by a terminal;
- a first authenticating module 132, configured to authenticate the information to be authenticated;
- a first storage module 133, configured to store, in a case that authentication is passed, at least one authentication information corresponding to the information to be authenticated in a blockchain ledger,
- wherein the information to be authenticated includes user credential information and/or attribute information; the user credential information includes terminal identification information;
- the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

The access control apparatus provided by the embodiments of the present disclosure implements the following of: receiving information to be authenticated sent by a terminal; authenticating the information to be authenticated; storing, in a case that authentication is passed, at least one authentication information corresponding to the information to be authenticated in a blockchain ledger, wherein the information to be authenticated includes user credential information and/or attribute information; the user credential information includes terminal identification information; the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal; the apparatus can support and achieve the scheme of using blockchain for access control, and provide attribute verification services to customers in the form of blockchain, can avoid the similar problem on a single point of failure caused by traditional authentication servers being attacked by DDoS.

Further, the at least one authentication information further includes: a timestamp corresponding to the terminal; and/or, validity period information of a second information, wherein the timestamp is a timestamp of the first signature information obtained by signing with the private key of the terminal; the second information includes at least one of the attribute information, first terminal identification information, second terminal identification information, and third terminal identification information.

The storing, in a case that the authentication is passed, at least one authentication information corresponding to the information to be authenticated in the blockchain ledger includes: generating randomly a first key for encryption;

using the first key to encrypt the at least one authentication information for storing in the blockchain ledger.

Further, the access control apparatus also includes: a first processing module, configured to use, after the generating randomly the first key for encryption, the public key of the terminal to encrypt the first key for storing in the blockchain ledger.

The authenticating the information to be authenticated includes: sending, according to a first preset policy, user credential information in the information to be authenticated to at least one second network side device for authentication; receiving a first authentication result feedback by the at least one second network side device and corresponding third signature information; obtaining, according to a second preset policy, the first authentication result and the third signature information, a first final result of whether the user credential information is authenticated and passed.

In the embodiment of the present disclosure, the authenticating the information to be authenticated includes: sending, according to a first preset policy, attribute information in the information to be authenticated to at least one third network side device for authentication; receiving a second authentication result feedback by the at least one third network side device and corresponding fourth signature information; obtaining, according to a third preset policy, the second authentication result and the fourth signature information, a second final result of whether the attribute information is authenticated and passed.

The authenticating the information to be authenticated includes: sending the information to be authenticated to a second blockchain node; receiving a first authentication result corresponding to the user credential information in the information to be authenticated feedback by the second blockchain node and corresponding third signature information; and obtaining, according to a second preset policy, the first authentication result and third signature information, a first final result of whether the user credential information is authenticated and passed; and/or, receiving a second authentication result corresponding to the attribute information in the information to be authenticated feedback by the second blockchain node and corresponding fourth signature information; and obtaining, according to a third preset policy, the second authentication result and fourth signature information, a second final result of whether the attribute information is authenticated and passed.

The above-mentioned implementation embodiments of the access control method of the first blockchain node side are all applicable to the embodiments of the access control apparatus, and can also achieve the corresponding same technical effect.

Figure 14:
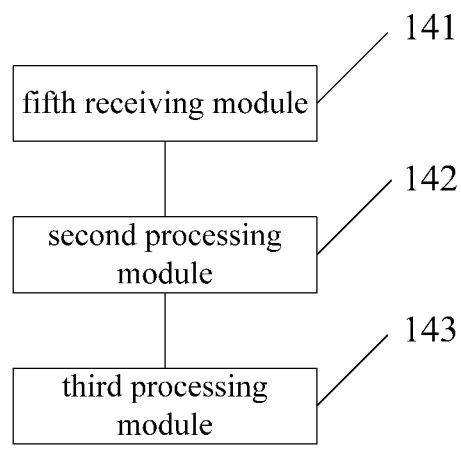
FIG. 14 is a fourth schematic structural view of the access control apparatus according to an embodiment of the present disclosure.

The embodiment of present disclosure also provides an access control apparatus, applied to the second blockchain node, as shown in FIG. 14, which includes:
- a fifth receiving module 141, configured to receive information to be authenticated of the terminal sent by a first blockchain node;
- a second processing module 142, configured to send user credential information in the information to be authenticated to at least one second network side device for authentication, and receive a first authentication result feedback by the at least one second network side device and corresponding third signature information for feedbacking to the first blockchain node; and/or,
- a third processing module 143, configured to send the attribute information in the information to be authenticated to at least one third network side device for authentication; and receive a second authentication result feedback by the at least one third network side device and corresponding fourth signature information for feedbacking to the first blockchain node,
wherein the user credential information includes terminal identification information.

The access control apparatus provided by the embodiments of the present disclosure implements the following of: receiving information to be authenticated of the terminal sent by a first blockchain node; sending user credential information in the information to be authenticated to at least one second network side device for authentication, and receiving a first authentication result feedback by the at least one second network side device and corresponding third signature information for feedbacking to the first blockchain node; and/or, sending the attribute information in the information to be authenticated to at least one third network side device for authentication; and receiving a second authentication result feedback by the at least one third network side device and corresponding fourth signature information for feedbacking to the first blockchain node, wherein the user credential information includes terminal identification information; the apparatus can support and achieve the scheme of using blockchain for access control, and provide attribute verification services to customers in the form of blockchain, can avoid the similar problem on a single point of failure caused by traditional authentication servers being attacked by DDoS.

The above-mentioned implementation embodiments of the access control method of the second blockchain node side are all applicable to the embodiments of the access control apparatus, and can also achieve the corresponding same technical effect.

Figure 15:
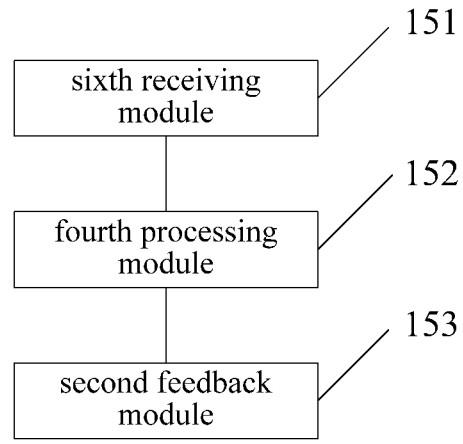
FIG. 15 is a fifth schematic structural view of the access control apparatus according to an embodiment of the present disclosure.

An embodiment of the present disclosure also provides an access control apparatus, applied to a second network side device, as shown in FIG. 15, which includes:
- a sixth receiving module 151, configured to receive the user credential information of the terminal to be authenticated sent by the blockchain node;
- a fourth processing module 152, configured to authenticate the user credential information to obtain a first authentication result, and use a third signature information for signature; and
- a second feedback module 153, configured to feedback the first authentication result and the third signature information to the blockchain node,
wherein the blockchain node is a first blockchain node or a second blockchain node communicating with the first blockchain node;
the user credential information includes terminal identification information.

The access control apparatus provided by the embodiments of the present disclosure implements the following of: receiving the user credential information of the terminal to be authenticated sent by the blockchain node; authenticating the user credential information to obtain a first authentication result, and using a third signature information for signature; and feedbacking the first authentication result and the third signature information to the blockchain node, wherein the blockchain node is a first blockchain node or a second blockchain node communicating with the first blockchain node; the user credential information includes terminal identification information; the apparatus can support and achieve the scheme of using blockchain for access control, and provide attribute verification services to customers in the form of blockchain, can avoid the similar problem on a single point of failure caused by traditional authentication servers being attacked by DDoS.

The above-mentioned implementation embodiments of the access control method of the second network side device side are all applicable to the embodiments of the access control apparatus, and can also achieve the corresponding same technical effect.

Figure 16:
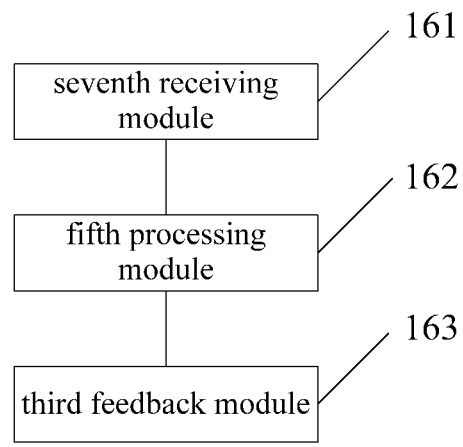
FIG. 16 is a sixth schematic structural view of the access control apparatus according to an embodiment of the present disclosure.

An embodiment of the present disclosure also provides an access control apparatus, applied to a third network side device, as shown in FIG. 16, which includes:
- a seventh receiving module 161, configured to receive the attribute information of the terminal to be authenticated sent by the blockchain node;
- a fifth processing module 162, configured to authenticate the attribute information to obtain a second authentication result, and use a fourth signature information for signature; and
- a third feedback module 163, configured to feedback the second authentication result and the fourth signature information to the blockchain node,
- wherein the blockchain node is a first blockchain node or a second blockchain node communicating with the first blockchain node.

The access control apparatus provided by the embodiments of the present disclosure implements the following of: receiving the attribute information of the terminal to be authenticated sent by the blockchain node; authenticating the attribute information to obtain a second authentication result, and using a fourth signature information for signature; and feedbacking the second authentication result and the fourth signature information to the blockchain node, wherein the blockchain node is a first blockchain node or a second blockchain node communicating with the first blockchain node; the apparatus can support and achieve the scheme of using blockchain for access control, and provide attribute verification services to customers in the form of blockchain, can avoid the similar problem on a single point of failure caused by traditional authentication servers being attacked by DDoS.

The above-mentioned implementation embodiments of the access control method of the third network side device side are all applicable to the embodiments of the access control apparatus, and can also achieve the corresponding same technical effect.

Figure 17:
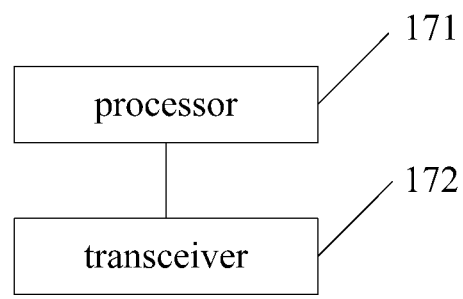
FIG. 17 is a first schematic structural view of a network side device according to an embodiment of the present disclosure.

An embodiment of the present disclosure also provides a network side device, the network side device is a first network side device, as shown in FIG. 17, which includes: a processor 171 and a transceiver 172, where
- the processor 171 is configured to receive, through the transceiver 172, relevant information to be verified that is sent by a terminal and corresponds to an access request, wherein the relevant information to be verified includes private key signature information of the terminal and position information of preset information in the blockchain;
- obtain, according to the position information, the preset information from the blockchain;
- verify the terminal according to the private key signature information and the preset information;
- obtain, in a case that verification is passed, attribute information of the terminal from a blockchain ledger according to the preset information;
- feedback, according to the attribute information, a request response for access control to the terminal through the transceiver 172,
- wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

The network side device provided by the embodiments of the present disclosure implements the following of: receiving relevant information to be verified that is sent by a terminal and corresponds to an access request, wherein the relevant information to be verified includes private key signature information of the terminal and position information of preset information in the blockchain; acquiring the preset information from the blockchain according to the position information; verifying the terminal according to the private key signature information and the preset information; acquiring, in a case that verification is passed, attribute information of the terminal from a blockchain ledger according to the preset information; feedbacking a request response for access control to the terminal according to the attribute information, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal; the device can support and achieve the scheme of using blockchain for access control, and provide attribute verification services to customers in the form of blockchain, can avoid the similar problem on a single point of failure caused by traditional authentication servers being attacked by DDoS.

The receiving relevant information to be verified corresponding to the access request sent by the terminal includes: receiving the access request sent by the terminal, wherein relevant information to be verified is carried in the access request; or, receiving the access request sent by the terminal; feedbacking, according to the access request, a random number to the terminal; receiving relevant information to be verified sent by the terminal according to the random number.

In the embodiment of the present disclosure, the verifying, in the case that the preset information includes public key information of the terminal, the terminal according to the private key signature information and the preset information, includes: using the public key information to verify the private key signature information; the obtaining, in the case that verification is passed, attribute information of the terminal from the blockchain ledger according to the preset information includes: obtaining, in a case that the verification is passed, corresponding third terminal identification information from the blockchain ledger according to the public key information; obtaining, in a case that the third terminal identification information is obtained, attribute information corresponding to the third terminal identification information from the blockchain ledger as attribute information of the terminal.

The verifying, in the case that the preset information includes the first terminal identification information, the terminal according to the private key signature information and the preset information, includes: obtaining, according to the first terminal identification information, the public key information to be verified and the stored public key information of the terminal from the blockchain ledger; verifying, according to the public key information of the terminal, the public key information to be verified and the private key signature information; obtaining, in the case that verification is passed, attribute information of the terminal from the blockchain ledger according to the preset information includes: obtaining, in the case that the verification is passed, attribute information of the terminal from the blockchain ledger according to the first terminal identification information.

In the embodiment of the present disclosure, the verifying, in the case that the preset information includes the second terminal identification information and the public key information, the terminal according to the private key signature information and the preset information, includes: using the public key information in the preset information to verify the private key signature information; obtaining, according to the second terminal identification information, the stored public key information of the terminal from the blockchain ledger; and verifying, according to the acquired public key information of the terminal, the public key information in the preset information; or, using the public key information in the preset information to verify the private key signature information; obtaining, according to the second terminal identification information, the stored hash value of the public key of the terminal from the blockchain ledger; obtaining, according to the public key information in the preset information, the hash value to be verified; and verifying, according to the obtained hash value of the public key of the terminal, the hash value to be verified.

The verifying, in the case that the preset information includes the second terminal identification information and the hash value of the public key, the terminal according to the private key signature information and the preset information, includes: obtaining, according to the second terminal identification information, the stored public key information of the terminal from the blockchain ledger; obtaining, according to the hash value of the public key in the preset information, the public key information to be verified; verifying, according to the public key information to be verified, the private key signature information; and verifying, according to the acquired public key information of the terminal, the public key information to be verified.

In the embodiment of the present disclosure, the obtaining, in a case that verification is passed, attribute information of the terminal from the blockchain ledger according to the preset information includes: obtaining, in a case that the verification is passed, attribute information of the terminal from the blockchain ledger according to the second terminal identification information.

The private key signature information includes first signature information on a timestamp using the private key of the terminal, or second signature information of the random number on the first network side device in response to the access request sent by using the private key of the terminal.

In the embodiment of the present disclosure, in a case that the private key signature information includes the first signature information, the relevant information to be verified further includes the timestamp; the verifying the terminal according to the private key signature information and the preset information includes: confirming whether the timestamp is within a validity period; verifying, in a case that the timestamp is within the validity period, the terminal according to the private key signature information and the preset information.

The preset information further includes validity period information of the first information; the first information includes at least one of the attribute information, the first terminal identification information and the second terminal identification information; the verifying the terminal according to the private key signature information and the preset information includes: confirming, according to the validity period information, whether the first information is within the validity period; verifying, in a case that the first information is within the validity period, the terminal according to the private key signature information and other information except the validity period information in the preset information.

In the embodiment of the present disclosure, at least one authentication information related to the terminal is stored in the blockchain ledger as encrypted information encrypted with a first key; the relevant information to be verified further includes the first key encrypted with the public key of the first network side device; the processor is also configured to use, prior to the feeding back, according to the attribute information, the request response for access control to the terminal, the private key of the first network side device to decrypt the first key encrypted by the public key to obtain the first key; decrypting, according to the first key, the encrypted information obtained from the blockchain ledger to obtain the at least one authentication information, wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Further, the at least one authentication information further includes: a timestamp corresponding to the terminal; and/or, validity period information of a second information, wherein the timestamp is a timestamp of a first signature information obtained by signing with the private key of the terminal; the second information includes at least one of the attribute information, first terminal identification information, second terminal identification information, and third terminal identification information.

The above-mentioned implementation embodiments of the access control method of the first network side device side are all applicable to the embodiments of the network side device, and can also achieve the corresponding same technical effect.

Figure 18:
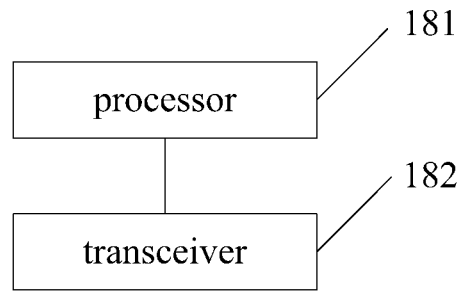
FIG. 18 is a schematic structural view of a terminal according to an embodiment of the present disclosure.

An embodiment of the present disclosure also provides a terminal, as shown in FIG. 18, which includes: a processor 181 and a transceiver 182, where the processor 181 is configured to send, through the transceiver 182, relevant information to be verified corresponding to an access request to a first network side device, wherein the relevant information to be verified includes private key signature information of the terminal and position information of preset information in the blockchain;

receive, through the transceiver 182, a request response for access control feedback by the first network side device, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal.

The terminal provided by the embodiments of the present disclosure implements the following of: sending relevant information to be verified corresponding to an access request sent by a first network side device, wherein the relevant information to be verified includes private key signature information of the terminal and position information of preset information in the blockchain; receiving a request response for access control feedback by the first network side device, wherein the preset information includes public key information of the terminal, or first terminal identification information obtained according to the public key of the terminal, or second terminal identification information irrelevant to the public key of the terminal and the public key information of the terminal, or the second terminal identification information and a hash value of the public key of the terminal; the terminal can support and achieve the scheme of using blockchain for access control, and provide attribute verification services to customers in the form of blockchain, can avoid the similar problem on a single point of failure caused by traditional authentication servers being attacked by DDoS.

In the embodiment of the present disclosure, the sending the relevant information to be verified corresponding to the access request to the first network side device includes: sending the access request to the first network side device, wherein the relevant information to be verified is carried in the access request; or, sending the access request to the first network side device; receiving a random number feedback by the first network side device according to the access request; sending, according to the random number, relevant information to be verified to the first network side device.

The private key signature information includes first signature information on a timestamp using the private key of the terminal, or second signature information of the random number on the first network side device in response to the access request sent by using the private key of the terminal.

In the embodiment of the present disclosure, in a case that the private key signature information includes the first signature information, the relevant information to be verified further includes the timestamp.

The preset information further includes validity period information of the first information; the first information includes at least one of the attribute information of the terminal, the first terminal identification information and the second terminal identification information.

In the embodiment of the present disclosure, at least one authentication information related to the terminal is stored in the blockchain ledger as encrypted information encrypted with a first key; the relevant information to be verified further includes the first key encrypted with the public key of the first network side device; wherein the at least one authentication information includes at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

Further, the at least one authentication information further includes: a timestamp corresponding to the terminal; and/or, validity period information of the second information, wherein the timestamp is a timestamp of the first signature information obtained by signing with the private key of the terminal; the second information includes at least one of the attribute information, first terminal identification information, second terminal identification information, and third terminal identification information.

In the embodiment of the present disclosure, the processor is also configured to send, prior to the sending the relevant information to be verified corresponding to the access request to the first network side device, information to be authenticated of the terminal to a first blockchain node through the transceiver, wherein the information to be authenticated includes user credential information and/or attribute information; the user credential information includes terminal identification information.

The above-mentioned implementation embodiments of the access control method of the terminal side are all applicable to the embodiments of the terminal, and can also achieve the corresponding same technical effect.

Figure 19:
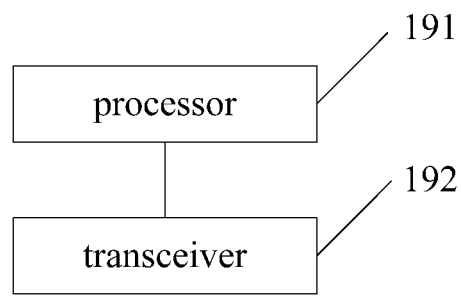
FIG. 19 is a first schematic structural view of a blockchain node structure according to an embodiment of the present disclosure.

The embodiment of the present disclosure also provides a blockchain node, the blockchain node is a first blockchain node, as shown in FIG. 19, which includes: a processor 191 and a transceiver 192;

the processor 191 is configured to receive, through the transceiver 192, information to be authenticated sent by a terminal;

authenticate the information to be authenticated;

store, in a case that authentication is passed, at least one authentication information corresponding to the information to be authenticated in a blockchain ledger, wherein the information to be authenticated includes user credential information and/or attribute information; the user credential information includes terminal identification information;

the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

The blockchain node provided by the embodiments of the present disclosure implements the following of: receiving information to be authenticated sent by a terminal; authenticating the information to be authenticated; storing, in a case that authentication is passed, at least one authentication information corresponding to the information to be authenticated in a blockchain ledger, wherein the information to be authenticated includes user credential information and/or attribute information; the user credential information includes terminal identification information; the at least one authentication information includes at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal; the blockchain node can support and achieve the scheme of using blockchain for access control, and provide attribute verification services to customers in the form of blockchain, can avoid the similar problem on a single point of failure caused by traditional authentication servers being attacked by DDoS.

The at least one authentication information further includes: a timestamp corresponding to the terminal; and/or, validity period information of a second information, wherein the timestamp is a timestamp of the first signature information obtained by signing with the private key of the terminal;

the second information includes at least one of the attribute information, first terminal identification information, second terminal identification information, and third terminal identification information.

In the embodiment of the present disclosure, the storing, in a case that the authentication is passed, at least one authentication information corresponding to the information to be authenticated in the blockchain ledger includes: generating randomly a first key for encryption; using the first key to encrypt the at least one authentication information for storing in the blockchain ledger.

The processor is also configured to use, after the generating randomly the first key for encryption, the public key of the terminal to encrypt the first key for storing in the blockchain ledger.

In the embodiment of the present disclosure, the authenticating the information to be authenticated includes: sending, according to a first preset policy, user credential information in the information to be authenticated to at least one second network side device for authentication; receiving a first authentication result feedback by the at least one second network side device and corresponding third signature information; obtaining, according to a second preset policy, the first authentication result and the third signature information, a first final result of whether the user credential information is authenticated and passed.

The authenticating the information to be authenticated includes: sending, according to a first preset policy, attribute information in the information to be authenticated to at least one third network side device for authentication; receiving a second authentication result feedback by the at least one third network side device and corresponding fourth signature information; obtaining, according to a third preset policy, the second authentication result and the fourth signature information, a second final result of whether the attribute information is authenticated and passed.

In the embodiment of the present disclosure, the authenticating the information to be authenticated includes: sending the information to be authenticated to a second blockchain node; receiving a first authentication result corresponding to the user credential information in the information to be authenticated feedback by the second blockchain node and corresponding third signature information; and obtaining, according to a second preset policy, the first authentication result and third signature information, a first final result of whether the user credential information is authenticated and passed; and/or, receiving a second authentication result corresponding to the attribute information in the information to be authenticated feedback by the second blockchain node and corresponding fourth signature information; and obtaining, according to a third preset policy, the second authentication result and fourth signature information, a second final result of whether the attribute information is authenticated and passed.

The above-mentioned implementation embodiments of the access control method of the first blockchain node side are all applicable to the embodiments of the blockchain node, and can also achieve the corresponding same technical effect.

Figure 20:
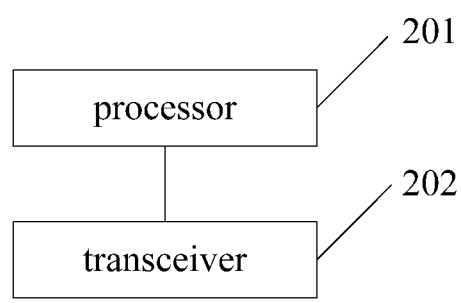
FIG. 20 is a second schematic structural view of the blockchain node structure according to an embodiment of the present disclosure.

An embodiment of the present disclosure also provides a blockchain node, the blockchain node is a second blockchain node, as shown in FIG. 20, which includes: a processor 201 and a transceiver 202;

the processor 201 is configured to receive, through the transceiver 202, information to be authenticated of the terminal sent by the first blockchain node;

send, through the transceiver 202, the user credential information in the information to be authenticated to at least one second network side device for authentication, and receive the first authentication result feedback by the at least one second network side device and the corresponding third signature information for feedbacking to the first blockchain node; and/or, send, through the transceiver 202, the attribute information in the information to be authenticated to at least one third network side device for authentication, and receive a second authentication result feedback by the at least one third network side device and a corresponding fourth signature information for feedbacking to the first blockchain node;

wherein the user credential information includes terminal identification information.

The blockchain node provided by the embodiment of the present disclosure implements the following of: receiving information to be authenticated of the terminal sent by the first blockchain node; sending the user credential information in the information to be authenticated to at least one second network side device for authentication, and receiving the first authentication result feedback by the at least one second network side device and the corresponding third signature information for feedbacking to the first blockchain node; and/or, sending the attribute information in the information to be authenticated to at least one third network side device for authentication, and receiving a second authentication result feedback by the at least one third network side device and a corresponding fourth signature information for feedbacking to the first blockchain node; wherein the user credential information includes terminal identification information; the blockchain node can support and achieve the scheme of using blockchain for access control, and provide attribute verification services to customers in the form of blockchain, can avoid the similar problem on a single point of failure caused by traditional authentication servers being attacked by DDoS.

The above-mentioned implementation embodiments of the access control method of the second blockchain node side are all applicable to the embodiments of the blockchain node, and can also achieve the corresponding same technical effect.

Figure 21:
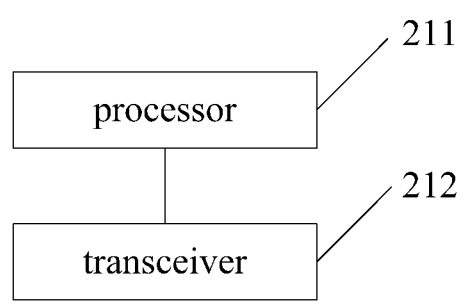
FIG. 21 is a second schematic structural view of a network side device according to an embodiment of the present disclosure.

An embodiment of the present disclosure also provides a network side device, the network side device is a second network side device, as shown in FIG. 21, including: a processor 211 and a transceiver 212, where the processor 211 is configured to receive, through the transceiver 212, the user credential information of the terminal to be authenticated sent by the blockchain node;

authenticate the user credential information to obtain a first authentication result, and use the third signature information for signature;

feedback, through the transceiver 212, the first authentication result and the third signature information to the blockchain node, wherein the blockchain node is a first blockchain node or a second blockchain node communicating with the first blockchain node;

the user credential information includes terminal identification information.

The network side device provided by the embodiment of the present disclosure implements the following of: receiving the user credential information of the terminal to be authenticated sent by the blockchain node; authenticating the user credential information to obtain a first authentication result, and using the third signature information for signature; feedbacking the first authentication result and the third signature information to the blockchain node, wherein the blockchain node is a first blockchain node or a second blockchain node communicating with the first blockchain node; the user credential information includes terminal identification information; the network side device can support and achieve the scheme of using blockchain for access control, and provide attribute verification services to customers in the form of blockchain, can avoid the similar problem on a single point of failure caused by traditional authentication servers being attacked by DDoS.

The above-mentioned implementation embodiments of the access control method of the second network side device side are all applicable to the embodiments of the network side device, and can also achieve the corresponding same technical effect.

Figure 22:
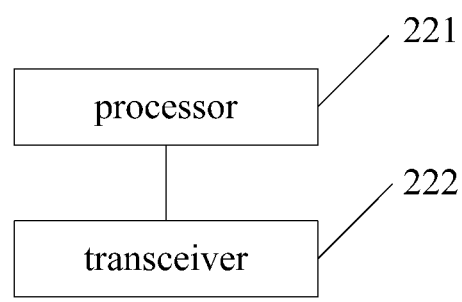
FIG. 22 is a third schematic structural view of the network side device according to an embodiment of the present disclosure.

An embodiment of the present disclosure also provides a network side device, wherein the network side device is a third network side device, as shown in FIG. 22, which includes: a processor 221 and a transceiver 222;

the processor 221 is configured to receive, through the transceiver 222, attribute information of the terminal to be authenticated sent by the blockchain node;

authenticate the attribute information to obtain a second authentication result, and use the fourth signature information for signature;

feedback, through the transceiver 222, the second authentication result and the fourth signature information to the blockchain node, wherein the blockchain node is a first blockchain node or a second blockchain node communicating with the first blockchain node.

The network side device provided by the embodiment of the present disclosure implements the following of: receiving attribute information of the terminal to be authenticated sent by the blockchain node; authenticating the attribute information to obtain a second authentication result, and using the fourth signature information for signature; feedbacking the second authentication result and the fourth signature information to the blockchain node, wherein the blockchain node is a first blockchain node or a second blockchain node communicating with the first blockchain node; the network side device can support and achieve the scheme of using blockchain for access control, and provide attribute verification services to customers in the form of blockchain, can avoid the similar problem on a single point of failure caused by traditional authentication servers being attacked by DDoS.

The above-mentioned implementation embodiments of the access control method of the third network side device side are all applicable to the embodiments of the network side device, and can also achieve the corresponding same technical effect.

An embodiment of the present disclosure also provides a network side device, including a memory, a processor, and a program stored on the memory and operable on the processor; wherein when the program is executed by the processor, the access control method of the above-mentioned first network side device side is implemented; or, when the program is executed by the processor, the access control method of the above-mentioned second network side device side is implemented; or when the program is executed by the processor, the access control method of the above-mentioned third network side device side is implemented.

The above-mentioned implementation embodiments of the access control method of the first network side device side, the second network side device side, and the third network side device side are all applicable to the embodiments of the network side device, and can also achieve the corresponding same technical effect.

An embodiment of the present disclosure also provides a terminal, including a memory, a processor, and a program stored on the memory and operable on the processor; wherein when the program is executed by the processor, the access control method of the above-mentioned terminal side is implemented.

The above-mentioned implementation embodiments of the access control method of the terminal side are all applicable to the embodiments of the terminal, and can also achieve the corresponding same technical effect.

An embodiment of the present disclosure also provides a blockchain node, including a memory, a processor, and a program stored on the memory and operable on the processor; wherein when the program is executed by the processor, the access control method of the above-mentioned first blockchain node side is implemented; or, when the program is executed by the processor, the access control method of the above-mentioned second blockchain node side is implemented.

The above-mentioned implementation embodiments of the access control method of the first blockchain node side or second blockchain node side are all applicable to the embodiments of the blockchain node, and can also achieve the corresponding same technical effect.

An embodiment of the present disclosure also provides a readable storage medium, on which a program is stored, wherein when the program is executed by a processor, steps in the access control method of the above-mentioned first network side device side is implemented; or, when the program is executed by a processor, steps in the access control method of the above-mentioned terminal side is implemented; or, when the program is executed by a processor, steps in the access control method of the above-mentioned first blockchain node side is implemented; or, when the program is executed by a processor, steps in the access control method of the above-mentioned second blockchain node side is implemented; or, when the program is executed by a processor, steps in the access control method of the above-mentioned second network side device side is implemented; or, when the program is executed by a processor, steps in the access control method of the above-mentioned third network side device side is implemented.

The above-mentioned implementation embodiments of the access control method of the first network side device side, the terminal side, the first blockchain node side, the second blockchain node side, the second network side device side or the third network side device side are all applicable to the embodiments of the readable storage medium, and can also achieve the corresponding same technical effect.

It should be noted that many functional components described in this specification are called modules, so as to more particularly emphasize the independence of implementation methods thereof.

In the embodiments of the present disclosure, the modules may be implemented in software, so as to be executed by various types of processors. An identified module of executable code may, by way of example, includes one or more physical or logical blocks of computer instructions which may, for example, be structured as an object, procedure, or function. Notwithstanding, the executable code of the identified module need not be physically located together, but may include distinct instructions stored in different bits, these instructions, when logically combined, constitute a module and achieve the stated purpose of the module.

Indeed, a module of executable code may be a single instruction, or many instructions, and may even be distributed over several different code segments, among different programs and across multiple memory devices. Similarly, operational data may be identified within modules, and may be implemented in any suitable form and organized within any suitable type of data structure. The operational data may be collected as a single data set, or may be distributed in different locations (including on different storage devices), and may exist, at least in part, only as electronic signals on a system or network.

In a case that the module can be realized by software, the module that can be realized by software by considering the level of the existing hardware technology, regardless of the cost, those skilled in the art can build the corresponding hardware circuit to realize the corresponding function. The hardware circuit includes conventional very-large-scale integration (VLSI) circuits or gate arrays as well as existing semiconductors such as logic chips, transistors, or other discrete components. A module may also be implemented in programmable hardware devices such as field programmable gate arrays, programmable array logic, programmable logic devices, and the like.

Those ordinarily skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Skilled artisans may implement the described functionality using different methods for each particular application, but such implementation should not be considered beyond the scope of the present disclosure.

Those skilled in the art can clearly understand that for the convenience and brevity of the description, the specific working process of the above-described system, apparatus and unit can refer to the corresponding process in the foregoing method embodiment, which will not be repeated here.

In the embodiments provided in the present disclosure, it should be understood that the disclosed apparatuses and methods may be implemented in other ways. For example, the apparatus embodiments described above are only illustrative, for example, the division of the units is only a logical function division. In actual implementation, there may be other division methods, for example, multiple units or components can be combined or may be integrated into another system, or some features may be ignored, or not implemented. In another point, the mutual coupling or direct coupling or communication connection shown or discussed may be achieved through some interfaces, and the indirect coupling or communication connection of apparatuses or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solutions of the embodiments of the present disclosure.

In addition, each functional unit in each embodiment of the present disclosure may be integrated into one processing unit, each unit may exist separately physically, or two or more units may be integrated into one unit.

If the functions described above are realized in the form of software function units and sold or used as independent products, the functions can be stored in a computer-readable storage medium. Based on this understanding, the technical solution of the present disclosure is essentially or the part that contributes to the prior art or the part of the technical solution can be embodied in the form of a software product, and the computer software product is stored in a storage medium, including several instructions are used to enable a computer device (which may be a personal computer, a server, or a network device, etc.) to execute all or part of the steps of the methods described in various embodiments of the present disclosure. The aforementioned storage medium includes: various media capable of storing program codes such as U disk, mobile hard disk, ROM, RAM, magnetic disk or optical disk.

It should be understood that the embodiments described in the embodiments of the present disclosure may be implemented by hardware, software, firmware, middleware, microcode or a combination thereof. For hardware implementation, modules, units, sub-modules, sub-units, etc. can be implemented in one or more application specific integrated circuits (Application Specific Integrated Circuits, ASIC), digital signal processing (Digital Signal Processing, DSP), digital signal processing device (DSP Device, DSPD), Programmable Logic Device (Programmable Logic Device, PLD), Field-Programmable Gate Array (Field-Programmable Gate Array, FPGA), general-purpose processor, controller, microcontroller, microprocessor, and other electronic units or combinations thereof that perform the functions described in the present disclosure.

What has been described above is the preferred embodiment of the present disclosure. It should be pointed out that those ordinarily skilled in the art can make some improvements and modifications without departing from the principle of the present disclosure. These improvements and modifications should also be regarded as protection scope of the present disclosure.

What is claimed is:

1. An access control method, applied to a first network side device, wherein the method comprises:
receiving relevant information to be verified that is sent by a terminal and corresponds to an access request, wherein the relevant information to be verified comprises private key signature information of the terminal and position information of preset information in the blockchain ledger;
acquiring the preset information from the blockchain ledger according to the position information;
verifying the terminal according to the private key signature information and the preset information;
acquiring, in a case that verification is passed, attribute information of the terminal from a blockchain ledger according to the preset information;
feedbacking a request response for access control to the terminal according to the attribute information,
wherein the preset information comprises public key information of the terminal, or first terminal identification information obtained according to the public key of the terminal, or second terminal identification information irrelevant to the public key of the terminal and the public key information of the terminal, or the second terminal identification information and a hash value of the public key of the terminal.

2. The access control method according to claim 1, wherein the receiving relevant information to be verified corresponding to the access request sent by the terminal comprises:
receiving the access request sent by the terminal, wherein relevant information to be verified is carried in the access request; or,
receiving the access request sent by the terminal;
feedbacking, according to the access request, a random number to the terminal;
receiving relevant information to be verified sent by the terminal according to the random number.

3. The access control method according to claim 1, wherein the verifying, in the case that the preset information comprises public key information of the terminal, the terminal according to the private key signature information and the preset information, comprises:
using the public key information to verify the private key signature information;
the obtaining, in the case that verification is passed, attribute information of the terminal from the blockchain ledger according to the preset information comprises:
obtaining, in a case that the verification is passed, corresponding third terminal identification information from the blockchain ledger according to the public key information;
obtaining, in a case that the third terminal identification information is obtained, attribute information corresponding to the third terminal identification information from the blockchain ledger as attribute information of the terminal.

4. The access control method according to claim 1, wherein the verifying, in the case that the preset information comprises the first terminal identification information, the terminal according to the private key signature information and the preset information, comprises:
obtaining, according to the first terminal identification information, the public key information to be verified and the stored public key information of the terminal from the blockchain ledger;
verifying, according to the public key information of the terminal, the public key information to be verified and the private key signature information;
obtaining, in the case that verification is passed, attribute information of the terminal from the blockchain ledger according to the preset information comprises:
obtaining, in the case that the verification is passed, attribute information of the terminal from the blockchain ledger according to the first terminal identification information.

5. The access control method according to claim 1, wherein the verifying, in the case that the preset information comprises the second terminal identification information and the public key information, the terminal according to the private key signature information and the preset information, comprises:
using the public key information in the preset information to verify the private key signature information; acquiring, according to the second terminal identification information, the stored public key information of the terminal from the blockchain ledger; and verifying, according to the acquired public key information of the terminal, the public key information in the preset information;
or,
using the public key information in the preset information to verify the private key signature information; acquiring, according to the second terminal identification information, the stored hash value of the public key of the terminal from the blockchain ledger; obtaining, according to the public key information in the preset information, the hash value to be verified; and verifying, according to the obtained hash value of the public key of the terminal, the hash value to be verified.

6. The access control method according to claim 1, wherein the verifying, in the case that the preset information comprises the second terminal identification information and the hash value of the public key, the terminal according to the private key signature information and the preset information, comprises:
acquiring, according to the second terminal identification information, the stored public key information of the terminal from the blockchain ledger;
obtaining, according to the hash value of the public key in the preset information, the public key information to be verified;
verifying, according to the public key information to be verified, the private key signature information; and
verifying, according to the acquired public key information of the terminal, the public key information to be verified.

7. The access control method according to claim 1, wherein the private key signature information comprises first signature information on a timestamp using the private key of the terminal, or second signature information of the random number on the first network side device in response to the access request sent by using the private key of the terminal;
in a case that the private key signature information comprises the first signature information, the relevant information to be verified further comprises the timestamp;
the verifying the terminal according to the private key signature information and the preset information comprises:
confirming whether the timestamp is within a validity period;
verifying, in a case that the timestamp is within the validity period, the terminal according to the private key signature information and the preset information.

8. The access control method according to claim 1, wherein the preset information further comprises validity period information of the first information; the first information comprises at least one of the attribute information, the first terminal identification information and the second terminal identification information;
the verifying the terminal according to the private key signature information and the preset information comprises:
confirming, according to the validity period information, whether the first information is within the validity period;
verifying, in a case that the first information is within the validity period, the terminal according to the private key signature information and other information except the validity period information in the preset information.

9. The access control method according to claim 1, wherein at least one authentication information related to the terminal is stored in the blockchain ledger as encrypted information encrypted with a first key; the relevant information to be verified further comprises the first key encrypted with the public key of the first network side device;

prior to the feeding back, according to the attribute information, the request response for access control to the terminal, the method further comprises:

using the private key of the first network side device to decrypt the first key encrypted by the public key to obtain the first key;

decrypting, according to the first key, the encrypted information obtained from the blockchain ledger to obtain the at least one authentication information, wherein the at least one authentication information comprises at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

10. A network side device, comprising a memory, a processor, and a program stored on the memory and operable on the processor; wherein when the program is executed by the processor, the access control method according to claim 1 is implemented.

11. An access control method, applied to a terminal, wherein the method comprises:

sending relevant information to be verified corresponding to an access request to a first network side device, wherein the relevant information to be verified comprises private key signature information of the terminal and position information of preset information in the blockchain;

receiving a request response for access control feedback by the first network side device, wherein the preset information comprises public key information of the terminal, or first terminal identification information obtained according to the public key of the terminal, or second terminal identification information irrelevant to the public key of the terminal and the public key information of the terminal, or the second terminal identification information and a hash value of the public key of the terminal.

12. The access control method according to claim 11, wherein the sending the relevant information to be verified corresponding to the access request to the first network side device comprises:

sending the access request to the first network side device, wherein the relevant information to be verified is carried in the access request; or, sending the access request to the first network side device; receiving a random number feedback by the first network side device according to the access request;

sending, according to the random number, relevant information to be verified to the first network side device.

13. The access control method according to claim 11, wherein the private key signature information comprises first signature information on a timestamp using the private key of the terminal, or second signature information of the random number on the first network side device in response to the access request sent by using the private key of the terminal;

in a case that the private key signature information comprises the first signature information, the relevant information to be verified further comprises the timestamp.

14. The access control method according to claim 11, wherein the preset information further comprises validity period information of the first information; the first information comprises at least one of the attribute information of the terminal, the first terminal identification information and the second terminal identification information.

15. The access control method according to claim 11, wherein at least one authentication information related to the terminal is stored in the blockchain ledger as encrypted information encrypted with a first key; the relevant information to be verified further comprises the first key encrypted with the public key of the first network side device;

wherein the at least one authentication information comprises at least one of the attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

16. A terminal, comprising a memory, a processor, and a program stored on the memory and operable on the processor; wherein when the program is executed by the processor, the access control method according to claim 11 is implemented.

17. An access control method, applied to a first blockchain node, wherein the method comprises:

receiving information to be authenticated sent by a terminal;

authenticating the information to be authenticated;

storing, in a case that authentication is passed, at least one authentication information corresponding to the information to be authenticated in a blockchain ledger, wherein the information to be authenticated comprises user credential information and/or attribute information; the user credential information comprises terminal identification information;

the at least one authentication information comprises at least one of attribute information of the terminal, the first terminal identification information obtained according to the public key of the terminal or the second terminal identification information irrelevant to the public key of the terminal or the third terminal identification information corresponding to the public key of the terminal, and the public key information of the terminal or the hash value of the public key of the terminal.

18. The access control method according to claim 17, wherein the at least one authentication information further comprises: a timestamp corresponding to the terminal; and/or, validity period information of a second information, wherein the timestamp is a timestamp of the first signature information obtained by signing with the private key of the terminal;

the second information comprises at least one of the attribute information, first terminal identification information, second terminal identification information, and third terminal identification information.

19. The access control method according to claim 17, wherein the storing, in the case that the authentication is passed, at least one authentication information corresponding to the information to be authenticated in the blockchain ledger comprises:

generating randomly a first key for encryption;
using the first key to encrypt the at least one authentication information for storing in the blockchain ledger.

20. A blockchain node, comprising a memory, a processor, and a program stored on the memory and operable on the processor; wherein when the program is executed by the processor, the access control method according to claim 17 is implemented.

* * * * *